US011828897B2

(12) United States Patent
Davies

(10) Patent No.: US 11,828,897 B2
(45) Date of Patent: Nov. 28, 2023

(54) SYSTEM, METHOD AND APPARATUS FOR CREATING VIRTUAL POINT SOURCES WITHIN A HYDROCARBON FORMATION

(71) Applicant: Cenovus Energy Inc., Calgary (CA)

(72) Inventor: Tim J. Davies, Calgary (CA)

(73) Assignee: Cenovus Energy Inc., Calgary (CA)

( * ) Notice: Subject to any disclaimer, the term of this patent is extended or adjusted under 35 U.S.C. 154(b) by 413 days.

(21) Appl. No.: 16/651,305

(22) PCT Filed: Oct. 9, 2018

(86) PCT No.: PCT/CA2018/051266
§ 371 (c)(1),
(2) Date: Mar. 26, 2020

(87) PCT Pub. No.: WO2019/071340
PCT Pub. Date: Apr. 18, 2019

(65) Prior Publication Data
US 2020/0271807 A1    Aug. 27, 2020

Related U.S. Application Data

(60) Provisional application No. 62/682,697, filed on Jun. 8, 2018, provisional application No. 62/659,966, filed
(Continued)

(51) Int. Cl.
*G01V 1/46* (2006.01)
*G01V 1/00* (2006.01)
*G01V 1/50* (2006.01)

(52) U.S. Cl.
CPC ............ *G01V 1/46* (2013.01); *G01V 1/001* (2013.01); *G01V 1/50* (2013.01)

(58) Field of Classification Search
CPC ............. G01V 1/46; G01V 1/001; G01V 1/50
See application file for complete search history.

(56) References Cited

U.S. PATENT DOCUMENTS 6,747,915 B2 *   6/2004   Calvert .................. G01V 1/362
                                                              367/27
7,819,805 B2    10/2010   Davies et al.
(Continued)

FOREIGN PATENT DOCUMENTS

CA          1130201        8/1982
WO      2015061305 A1     4/2015
(Continued)

OTHER PUBLICATIONS

ISA/CA Canadian Intellectual Property Office—International Search Report and Written Opinion of the International Searching Authority for PCT international application No. PCT/CA2019/050808 Filed Jun. 7, 2019.
(Continued)

*Primary Examiner* — Isam A Alsomiri
*Assistant Examiner* — Abdallah Abulaban
(74) *Attorney, Agent, or Firm* — GORDON & JACOBSON, P.C.

(57) ABSTRACT

Downhole tools and method for a well. At least some of the example embodiments are methods of imaging a formation around a first borehole, including: focusing first outbound acoustic energy, launched from a tool with the first borehole, on a volume within the formation spaced away from the first borehole, the focusing creates a first virtual point source (VPS) that creates a first return acoustic energy; receiving the first return acoustic energy from the first VPS at a plurality of seismic sensors; and determining a parameter of the formation between the first VPS and a location of the seismic sensors using the first return acoustic energy.

21 Claims, 18 Drawing Sheets

Related U.S. Application Data on Apr. 19, 2018, provisional application No. 62/570,499, filed on Oct. 10, 2017.

(56) References Cited

U.S. PATENT DOCUMENTS

| | | | |
|---|---|---|---|
| 8,665,667 B2* | 3/2014 | He | G01V 1/282 367/73 |
| 8,923,092 B2* | 12/2014 | Vu | G01V 1/46 181/111 |
| 2004/0044479 A1* | 3/2004 | Sansone | G01V 1/28 702/16 |
| 2008/0080308 A1* | 4/2008 | Hornby | G01V 1/40 367/25 |
| 2015/0013974 A1 | 1/2015 | Mekic et al. | |
| 2015/0109886 A1* | 4/2015 | Mekic | G01V 1/284 367/25 |
| 2015/0129230 A1* | 5/2015 | Carlson | E21B 43/00 166/308.1 |
| 2017/0311048 A1 | 2/2017 | Hilpert et al. | |
| 2017/0247995 A1 | 8/2017 | Crews et al. | |

FOREIGN PATENT DOCUMENTS

| | | |
|---|---|---|
| WO | 2015084390 A1 | 6/2015 |
| WO | 2015168417 A1 | 11/2015 |
| WO | 2016040669 A1 | 3/2016 |

OTHER PUBLICATIONS

ISA/CA Canadian Intellectual Property Office—International Preliminary Report on Patentability for PCT International application No. PCT/CA2018/051266 Filed Oct. 9, 2018.

ISA/CA Canadian Intellectual Property Office—International Search Report and Written Opinion of the International Searching Authority for PCT international application No. PCT/CA2018/051266 Filed Oct. 9, 2018.

* cited by examiner

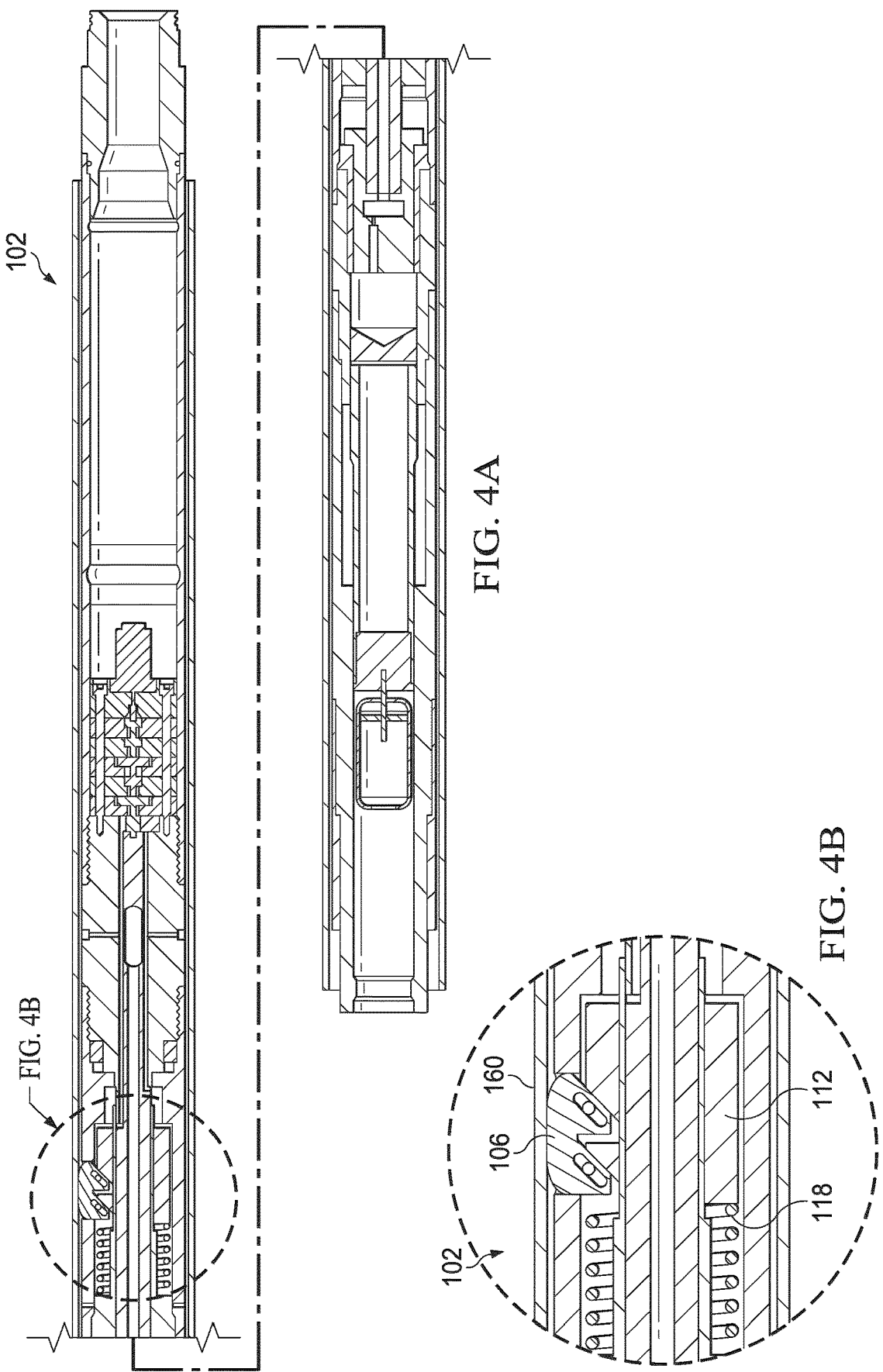

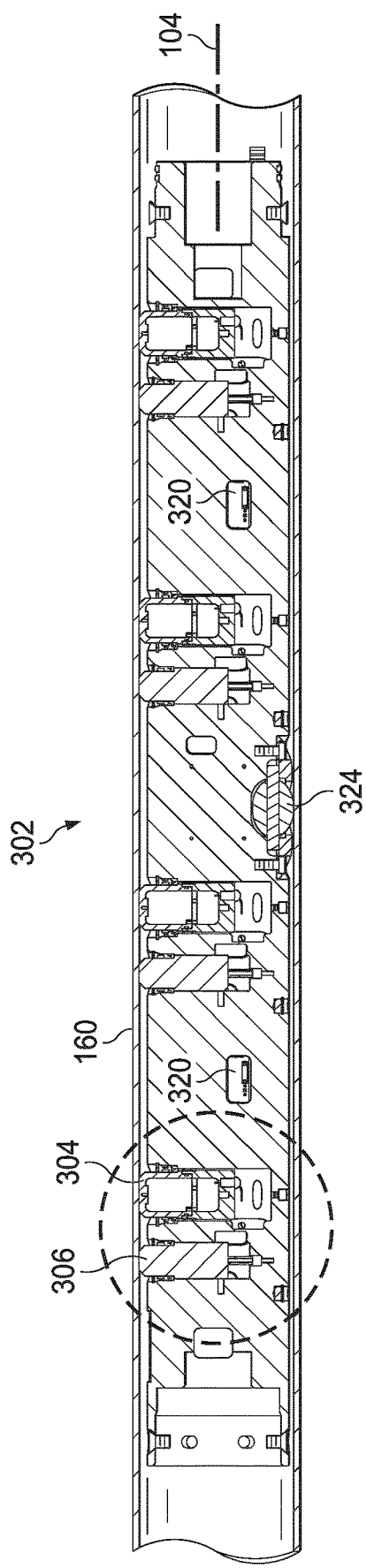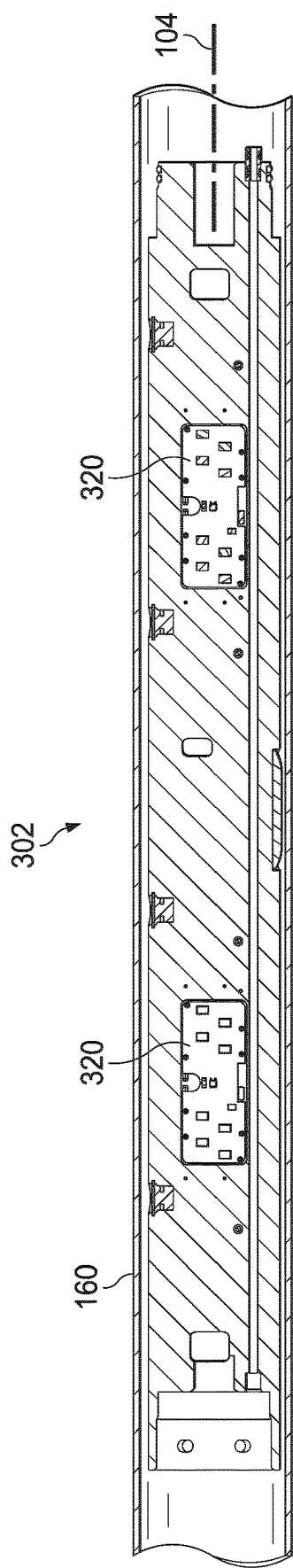
FIG. 12
FIG. 13

SYSTEM, METHOD AND APPARATUS FOR CREATING VIRTUAL POINT SOURCES WITHIN A HYDROCARBON FORMATION

CROSS-REFERENCE TO RELATED APPLICATIONS

This application is a national stage application under 35 U.S.C. 371 and claims the benefit of PCT Application No. PCT/CA2018/051266 having an international filing date of Oct. 9, 2018, which designated the United States, which PCT application claimed the benefit of: U.S. Provisional Application Ser. No. 62/570,499 filed Oct. 10, 2017 titled "System, Method and Apparatus for Downhole Tools for a Well"; U.S. Provisional Application Ser. No. 62/659,966 filed Apr. 19, 2018 titled "System, Method and Apparatus for Three-Dimensional Imaging of a Formation Remote from a Single Borehole"; and U.S. Provisional Application Ser. No. 62/682,697 filed Jun. 8, 2018 titled "System, Method and Apparatus for Reduced Water Usage for Fracking Hydrocarbon Wells with Three-Dimensional Imaging of the Formation From a Single Borehole." The disclosures of the PCT application and all three provisional applications are incorporated herein by reference in their entirety.

FIELD OF THE DISCLOSURE

Various embodiments relate to acoustic imaging of subsurface formations, and more particularly, to a system, method and apparatus for 3D acoustic imaging of a formation remote from a single borehole using a downhole tool within the borehole.

BACKGROUND OF THE INVENTION

Three-dimensional imaging of subsurface features for the purpose of characterizing and identifying important properties of a formation has been the focus of research for some oil and gas industry service and production companies for the purpose of planning the most efficient/optimized approach to recovering valuable resources contained within the formations.

Vertical seismic profiling is a technique of seismic measurements used for correlation with surface seismic data to get the seismic velocity and lithological structure near the borehole. Vertical seismic profiling has been used for small-scale seismic surveys, but such techniques can only determine properties of the formation closely surrounding (i.e., in close proximity to) the borehole.

There are several techniques that address some aspects of imaging a formation in a region remote from the borehole. For example, wave separation is an approach that separates the reflected acoustic waves into up-going and down-going waves. This technique is used to remove artifacts due to complex overburden encountered during conventional surface-based seismic surveys. Many so-called "virtual source" methods assume that the real sources are located at the surface, and either the receivers are also located at the surface, or are located down-hole. In either example, a virtual source may be located at the position of a physical receiver. Range-gating/time-gating and redatuming are typically used to position the virtual source at the location of the real receivers. There are other techniques that do not place the virtual source at the location of a real receiver, which utilize monopole and dipole sources that are typically used in logging tools, but these techniques require sources or receivers at the surface. These are sometimes referred to as single well reflection imaging and dipole shear wave imaging. Other solutions, such as cross-borehole tomography, require at least two boreholes, with the acoustic source in one borehole and receivers within an adjacent second borehole.

Improved techniques for generating three-dimensional images of a subsurface (i.e., subterranean) formation in a region remote from a single borehole continue to be of interest, to better determine the structure and properties of a formation, and to better delineate reservoirs and optimize recovery of valuable resources contained therein.

SUMMARY

Various embodiments are directed to systems, methods, and apparatuses for creating virtual point sources within a hydrocarbon formation. One example embodiment is a method comprising imaging a formation around a first borehole, the method comprising: focusing first outbound acoustic energy, launched from a tool with the first borehole, on a volume within the formation spaced away from the first borehole, the focusing creates a first virtual point source (VPS) that creates a first return acoustic energy; receiving the first return acoustic energy from the first VPS at a plurality of seismic sensors; and determining a parameter of the formation between the first VPS and a location of the seismic sensors using the first return acoustic energy.

Another example embodiment for a method using a downhole tool within a single borehole for imaging a geologic formation in a region remote from the single borehole, the method includes: focusing acoustic energy to create a virtual point source (VPS) at a first location in the formation remote from the borehole, using a plurality of phase controlled transducers of the downhole tool, to resonate the rock formation at the first VPS location; receiving signals, using a plurality of receivers of the downhole tool, from the resonating rock at the first VPS location in the formation; communicating the received signals to a processor; and determining, using the processor and the received signals, at least one parameter of the formation at the first VPS location.

Yet another example embodiment is a system for downhole operation in a well having a wellbore, a casing in the wellbore and an axis, the system comprising: an anchor tool configured to secure and maintain an axial position of the system in the wellbore, the anchor tool comprising dogs that are hydraulically-actuated, the dogs have an unlocked position wherein the dogs are at least substantially within the anchor tool, and a locked position wherein the dogs extend radially from the anchor tool into direct contact with the wellbore or a casing of the wellbore; a rotation tool coupled to the anchor tool and to an imaging tool, the rotation tool is configured to rotate the imaging tool in the wellbore to selected circumferential angles with respect to the axis; and wherein the imaging tool comprises: a transducer configured to interrogate a formation in which the well resides.

BRIEF DESCRIPTION OF THE DRAWINGS

For a more complete understanding of the present disclosure and its advantages, reference is now made to the following description taken in conjunction with the accompanying drawings.

FIG. 4 is a side view of the anchor tool of FIG. 3 showing the dogs in a locked position.

FIG. 12 is a sectional side view of the imaging tool of FIG. 11, taken along the line 12-12 of FIG. 11.

FIG. 13 is a sectional side view of the imaging tool of FIG. 11, taken along the line 13-13 of FIG. 11.

Figure 1:
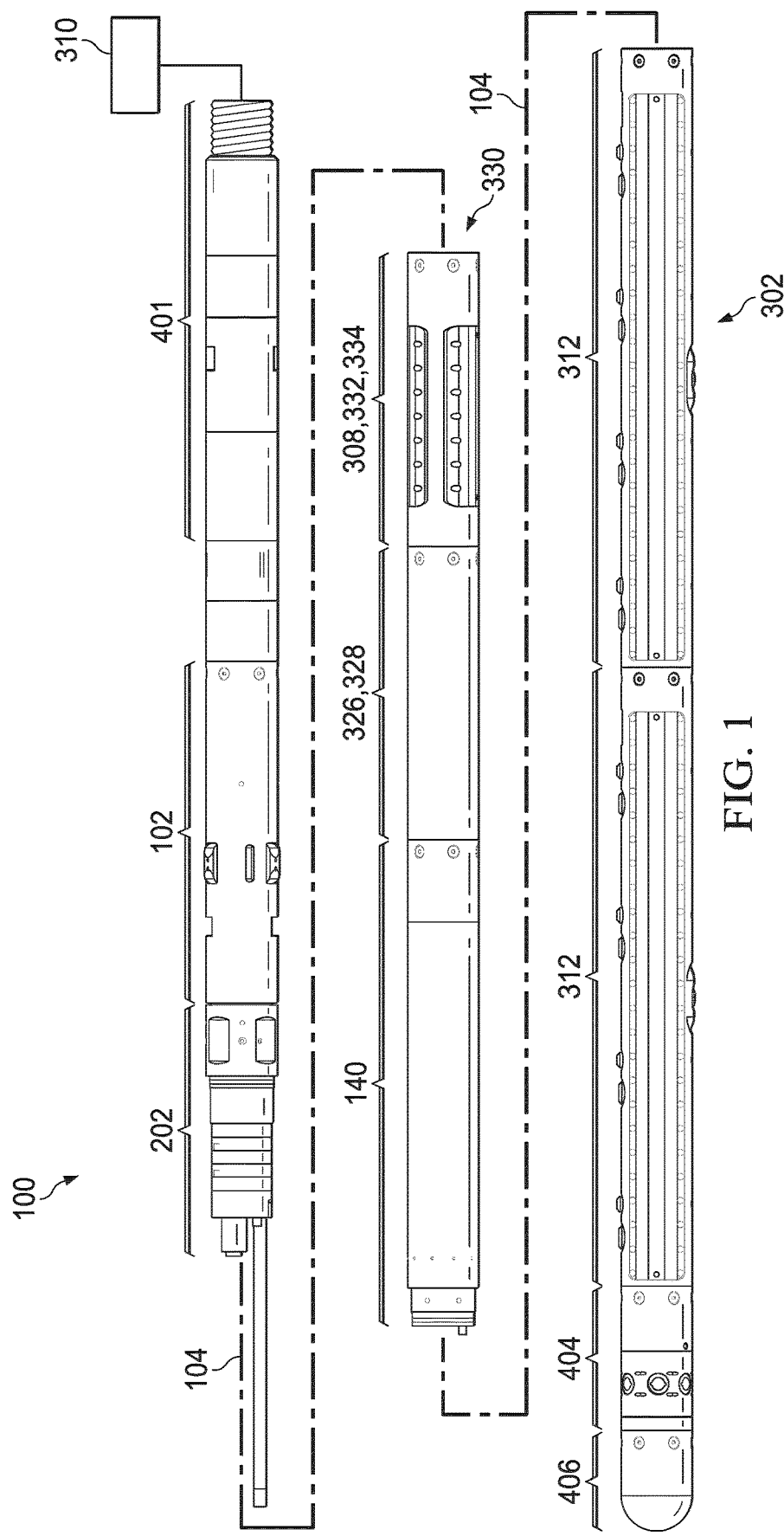
FIG. 1 is a side view of an embodiment of a downhole tool assembly.

The use of the same reference symbols in different drawings indicates similar or identical items. It should be understood that the specific embodiments shown in the drawings and described in the detailed description do not limit the disclosure. On the contrary, they provide the foundation for one of ordinary skill to discern the alternative forms, equivalents and modifications that are encompassed in the scope of the appended claims.

DEFINITIONS

Various terms are used to refer to particular system components. Different companies may refer to a component by different names—this document does not intend to distinguish between components that differ in name but not function.

"Virtual point source" shall mean a volume within a formation where no borehole exists, and from which acoustic energy propagates. An interface of rock formations having different densities, and from which acoustic energy reflects, shall not be considered a virtual point source.

"Sending a signal having two distinct frequencies" shall mean the signal is the superposition of the two (or more) distinct frequencies. Sending a signal of a single frequency that can be approximated as superposition of multiple signals each having its own distinct frequency (e.g., Fourier Series, Taylor Series), shall not be considered sending a signal having two distinct frequencies.

The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise. As used herein, no distinction is intended between a subsurface formation and a subterranean formation.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

DETAILED DESCRIPTION

Techniques for creating two-dimensional (2D) and three-dimensional (3D) images and acquiring data related to subsurface features and properties of a formation or region from near a borehole to a region remote from a borehole are disclosed. Such techniques reduce the costs of seismic surveys by acquiring seismic data without the huge expense and time required for conventional seismic acquisition methods.

Figure 18:
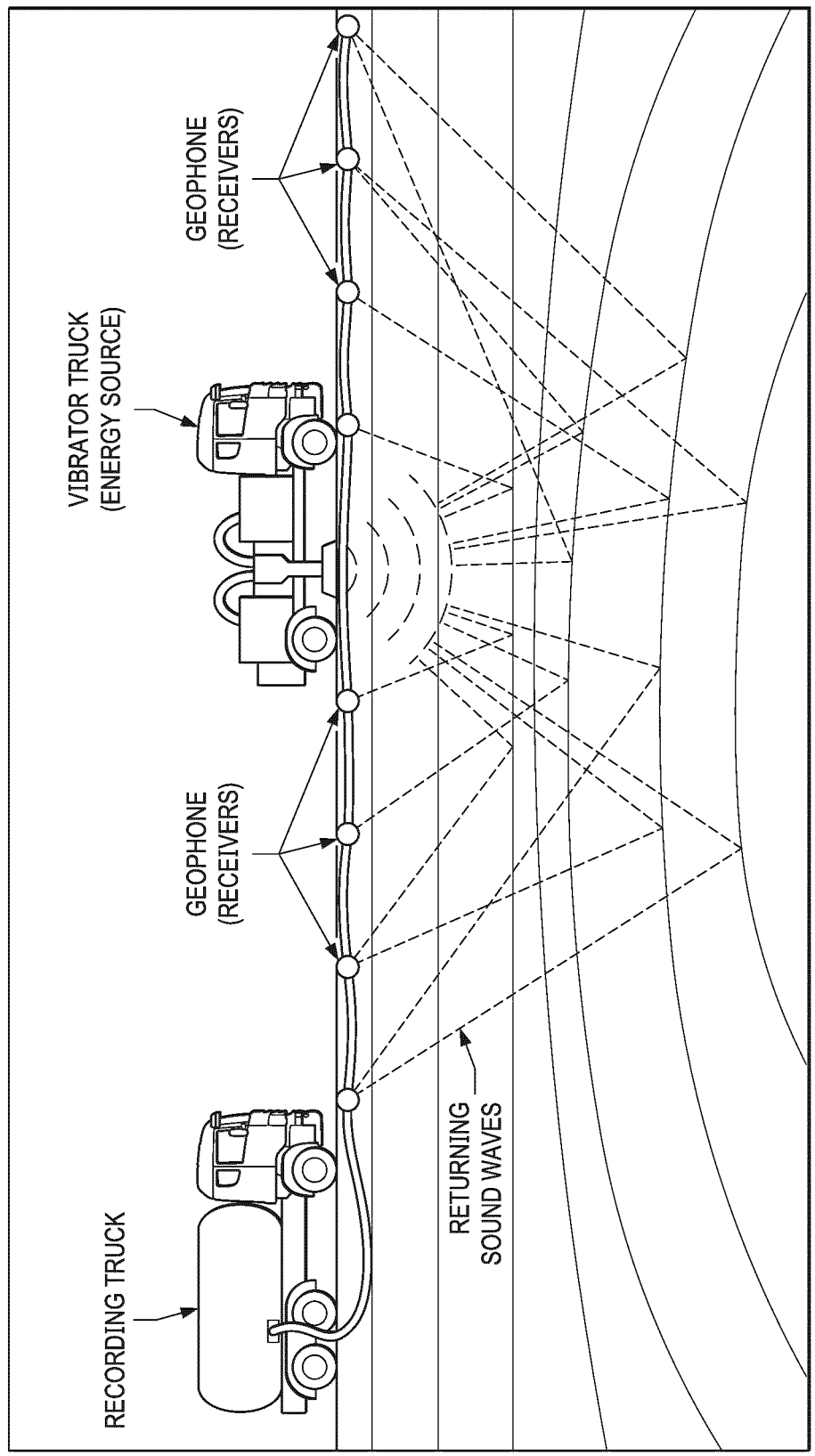
FIG. 18 is a schematic illustration of conventional seismic acquisition.
Figure 19:
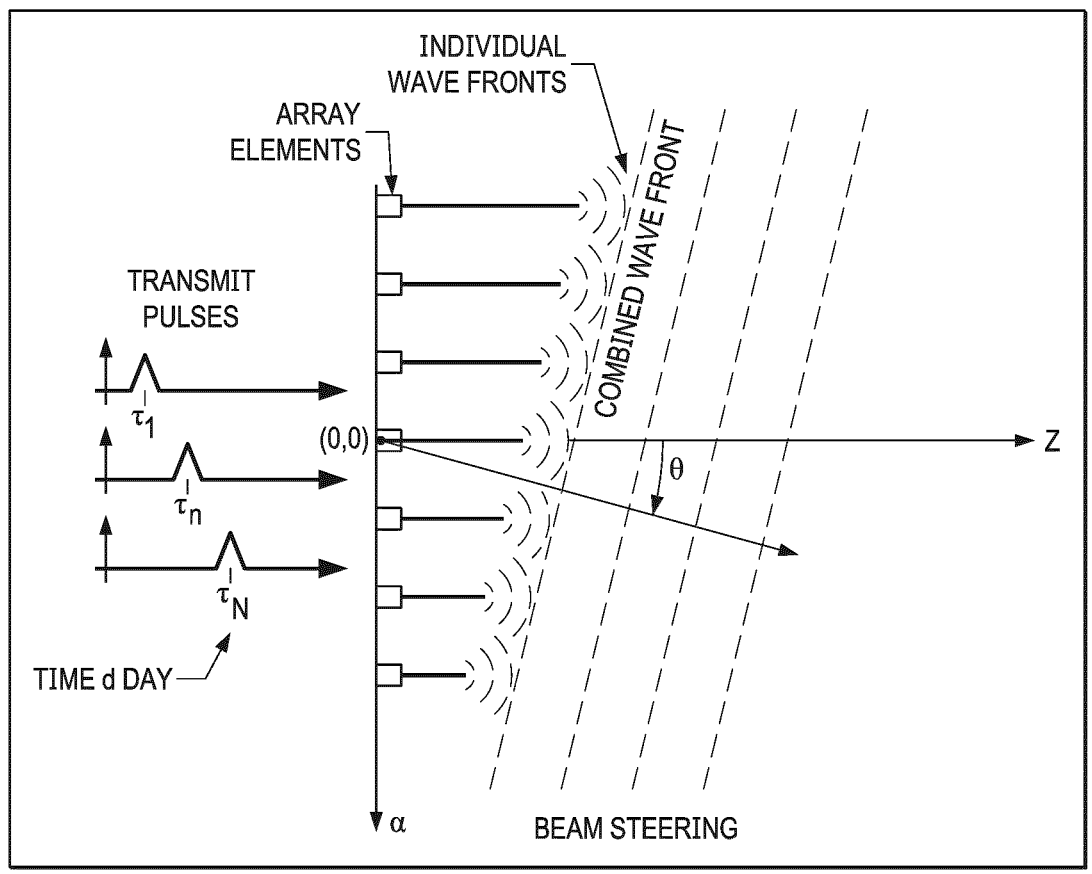
FIGS. 19-22 are schematic diagrams of embodiments of a tool body having an array of transducers and/or receivers that can be focused and/or steered using time delays.
Figure 20:
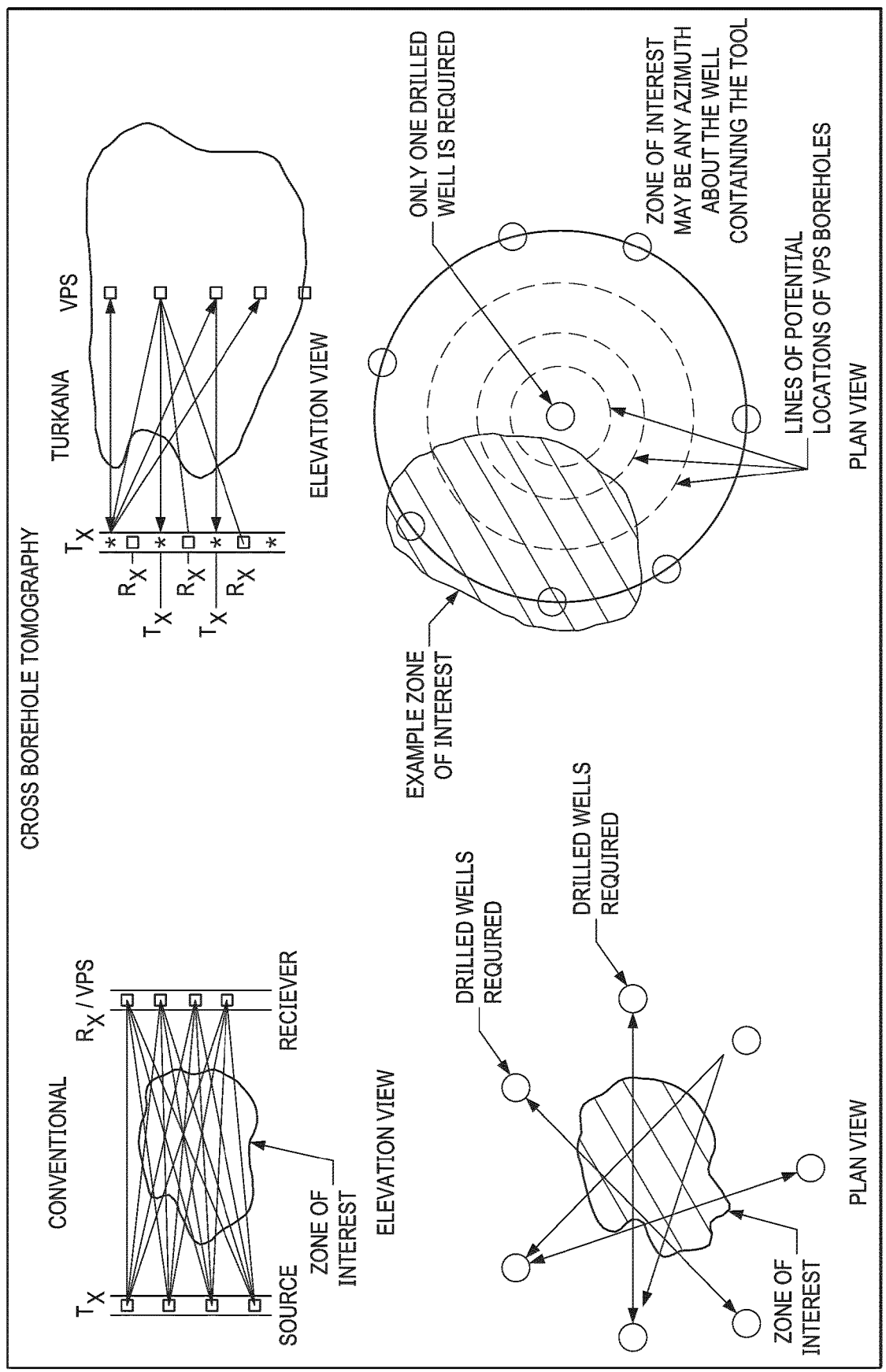
Figure 21:
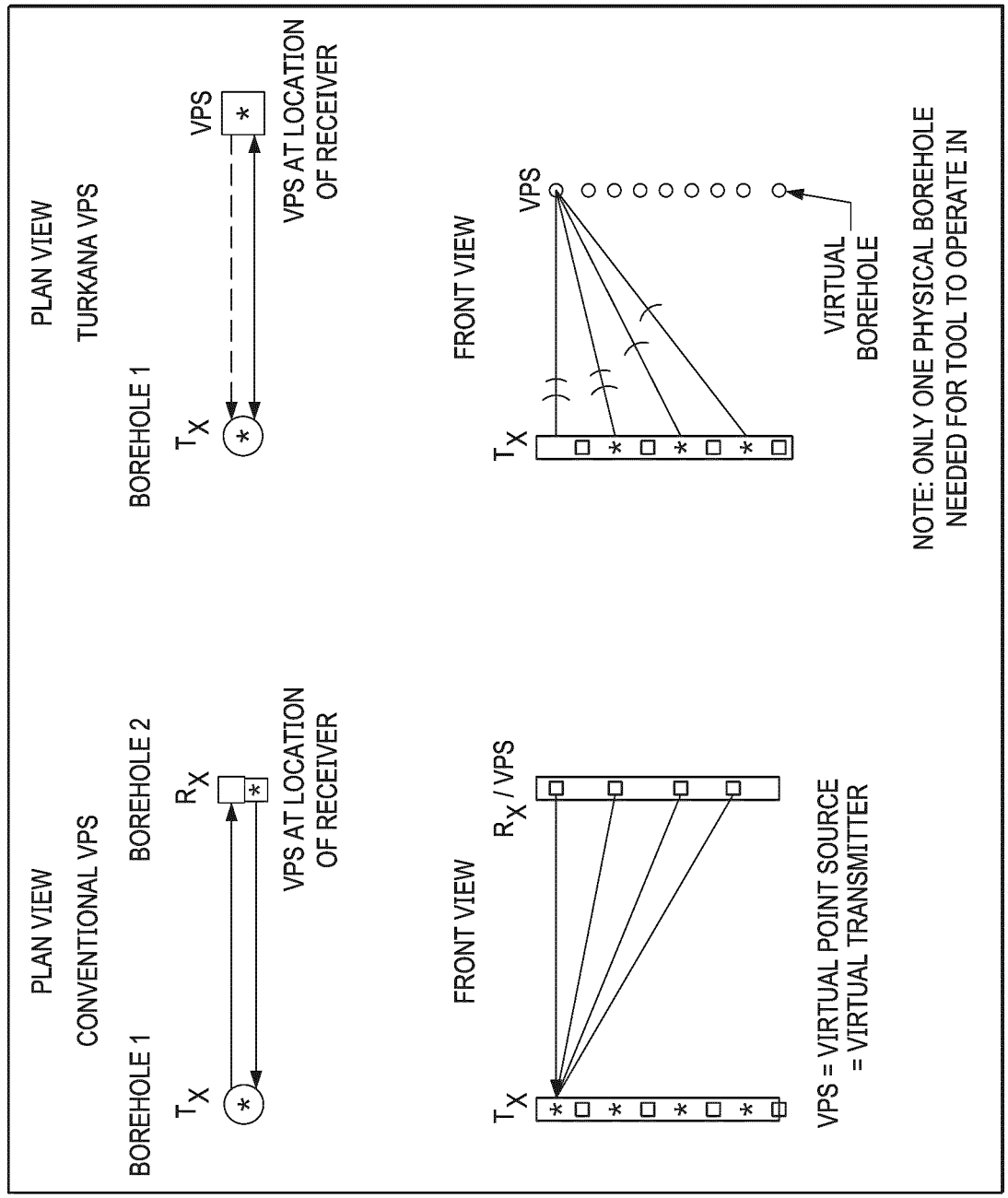
Figure 22:
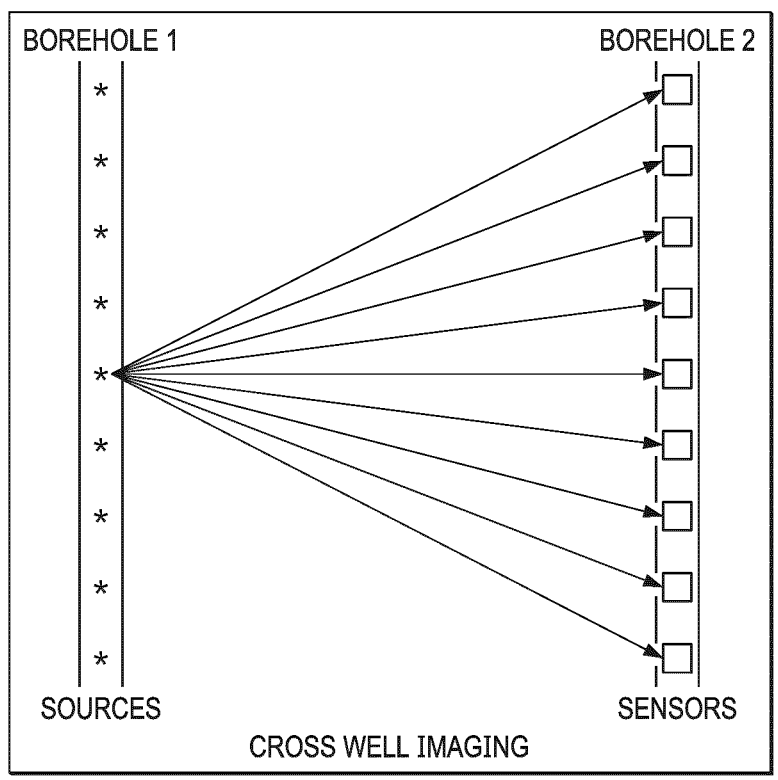

To better appreciate the advantages of the disclosed techniques, a brief introduction to conventional seismic imaging is useful. Seismic imaging uses an acoustic source (i.e., a transmitter) to launch acoustic waves into a formation, and utilizes sensors (i.e., receivers) to capture the reflected waves, which are then analyzed to help determine the subsurface structure. Seismic imaging is based on the geometry of where the source(s) and receiver(s) are positioned with respect to the formation of interest. As shown in FIG. 18, the positioning of the sensors and the resulting waves that are recorded can be considered sets of triangles. Note that if the land surface area, over which the receivers are to be placed, is small or limited, the depth to which the seismic waves can penetrate will be limited (i.e., shallower). A smaller surface arrangement of sensors is the same as having a smaller imaging aperture, hence the focal depth would tend to be shorter or shallower.

Creating a large enough aperture (i.e., arrangement of sensors) when carrying out land-based seismic surveys can be difficult when the surface areas include obstacles such as, for example, jungle, desert, arctic tundra, forest, urban settings, mountain regions, and savannah, and can also be a problem because of land ownership issues where the neighboring land owners refuse to allow the seismic crews to operate on their land, thus limiting the geometry of the acquisition. As will be appreciated, this is a good reason for using downhole tools with acoustic arrays instead of conventional surface seismic imaging.

Figure 17:
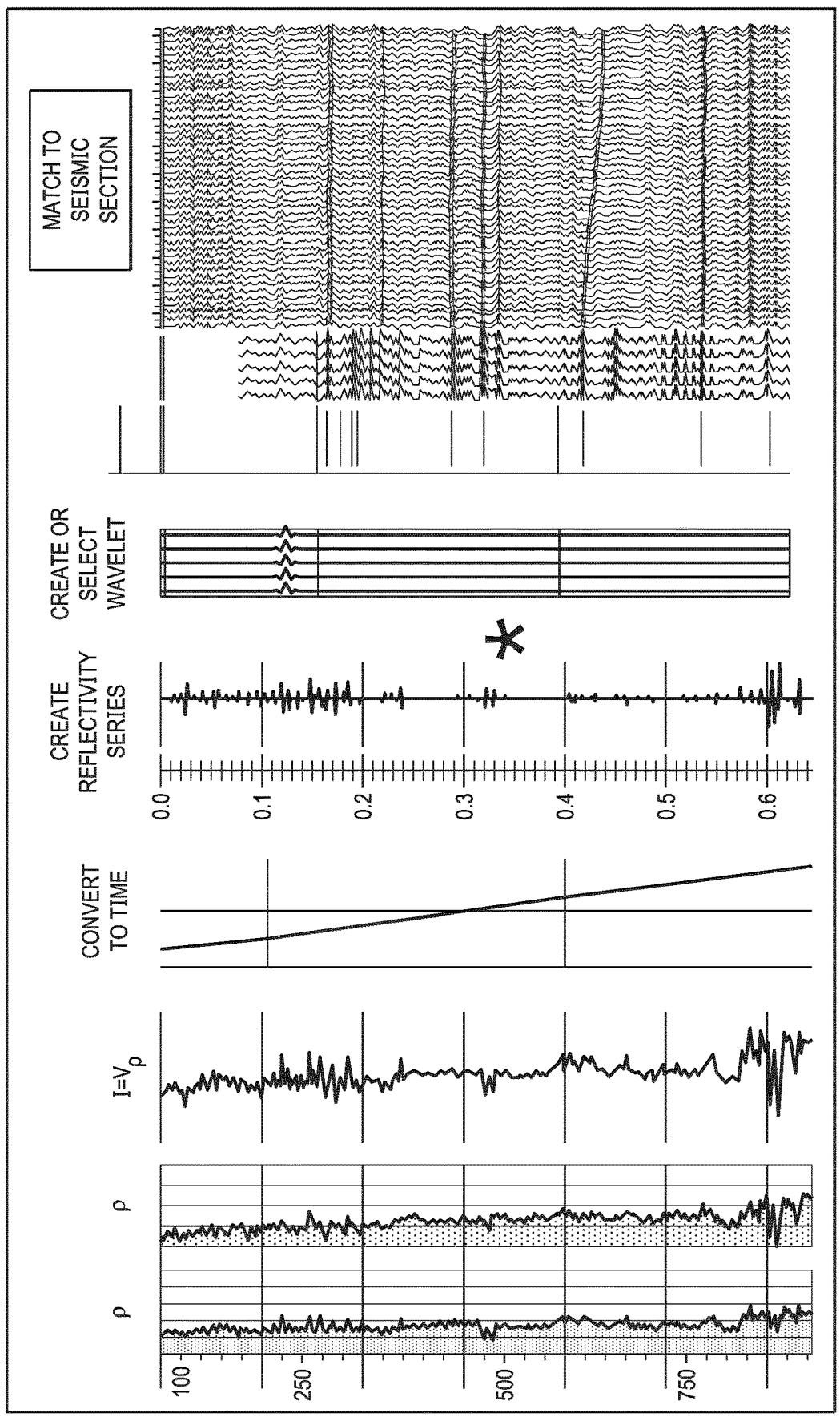
FIG. 17 depicts diagrams of conventional seismic acquisition.

Additionally, when surface seismic imaging cannot generate a sufficient resolution, synthetic traces can be generated to create a finer resolution from the limited data acquired from conventional seismic surveys. Referring now to FIG. 17, a synthetic seismogram is a seismic trace that has been constructed from various parameters obtainable from log information. It represents the seismic trace that could be observed with the seismic method at the well location. Simulated images can be referred to as synthetic images formed from density and velocity values, such as those obtained with a density log and a sonic log, respectively. A synthetic trace can be matched to an actual seismic trace acquired with conventional seismic imaging. Synthetic traces can be used when providing an estimate or model of the reservoir properties, such as formation velocity and density of the formation rock. The synthetic traces can be compared to cores, logs and real seismic data for better estimates of what is in the ground. Reservoir models are typically used to carry out hypothetical scenarios for potential drilling locations, production optimization, and reserves evaluations for accounting purposes. The combination of synthetic data with actual seismic data can be beneficial to reduce costs of performing seismic surveys.

In contrast, imaging the formation from a single borehole helps to avoid issues related to conventional surface-based seismic imaging described above, and reduces or eliminates reliance on synthetic traces that are typically needed because of the poor resolution and coverage of conventional seismic surveys. The disclosed techniques create virtual point sources (VPS) for imaging the formation from a borehole tool, rather than creating seismic waves from the surface and collecting data in the borehole. The borehole tool creates and transmits acoustic waves or acoustic energy into the formation. The acoustic energy is focused onto a particular volume of the formation, thereby created the VPS. The VPS, through various techniques described below, returns acoustic energy back to the borehole tool, where the return acoustic energy is received by seismic sensors. Using the returned acoustic energy, parameters of the formation between the borehole tool and the VPS may be determined. By created a plurality of virtual point sources a virtual borehole can be created at a distance from the actual borehole containing the tool to delineate and more clearly define the formation rock and its properties without drilling more wells (as is required with cross-borehole tomography or test holes).

As can be appreciated below, the disclosed techniques apply synthetic aperture imaging, and can utilize standard seismic reconstruction methods, including Kirchhoff migration. The disclosed techniques and tool can be used for "virtual" cross-borehole tomography using only a single well instead of the requisite two wells. Thus, formations can be properly delineated without having to drill extra wells, which results in substantial cost savings, because even test holes are expensive to drill, but are often drilled to gain a better understanding of the formation between production wells. Moreover, logging of the test holes is frequently carried out to obtain information required for conventional seismic imaging, such as the formation velocity and density.

Accordingly, the embodiments disclosed herein provide for acquisition of real acoustic data (e.g., seismic traces) to form images of such a zone (e.g., under an area with surface obstacles that make access to an area for conventional seismic difficult) from a single borehole. The specification now turns to example downhole tools useful for implementing such techniques.

Downhole tools in deep wells are subjected to high rupture and collapse forces that are orders of magnitude higher than shallower depths for which most tools are designed. To accomplish the techniques described herein, a downhole modular tool may be utilized that is suitable for deep wells and which includes at least one imaging module comprising a set of acoustic transducers and corresponding receivers that are positioned along the axis of the tool and situated in a wellbore. The tool is connected to a distributed acoustic sensing (DAS) system or fiber optic lines for conveying data to a surface processor and user interface where the data is processed to create, in real-time, a two or three-dimensional image of the subsurface formation from the borehole to a distance remote from the borehole. In one example, the sensors are small enough to fit into a tool for a seven-inch diameter borehole, and can use ultra-broadband transmitted acoustic signals (e.g., with a wide range of frequencies) so that the signals reach deeply into the formation. The materials used for the sensors are robust and reliable for very high pressures and temperatures. The sensors transmit electromagnetic waves or acoustic energy into the formation.

One version of the acoustic downhole tool includes transducers, motors for rotating the transducers, wireline setup and data transfer, positioning board, power systems, locking mechanism, processing modules (surface and downhole), user interface and 2D and 3D visualization capabilities. Versions of the downhole tool with associated data processing methods are used to acoustically interrogate and image the near and far region from a borehole in a subsurface formation or reservoir. Some embodiments of the downhole tool comprise various configurations of adaptive acoustic arrays including, but not limited to, active or passive arrays, synthetically focused arrays, divergent arrays, phased active arrays, arrays that use an ultra-sparse number of transmitters and receivers, arrays of variable length with a virtually unlimited number of transmission and reception locations, parametric arrays, and arrays that use multiple transducers and receivers concurrently.

Figure 2:
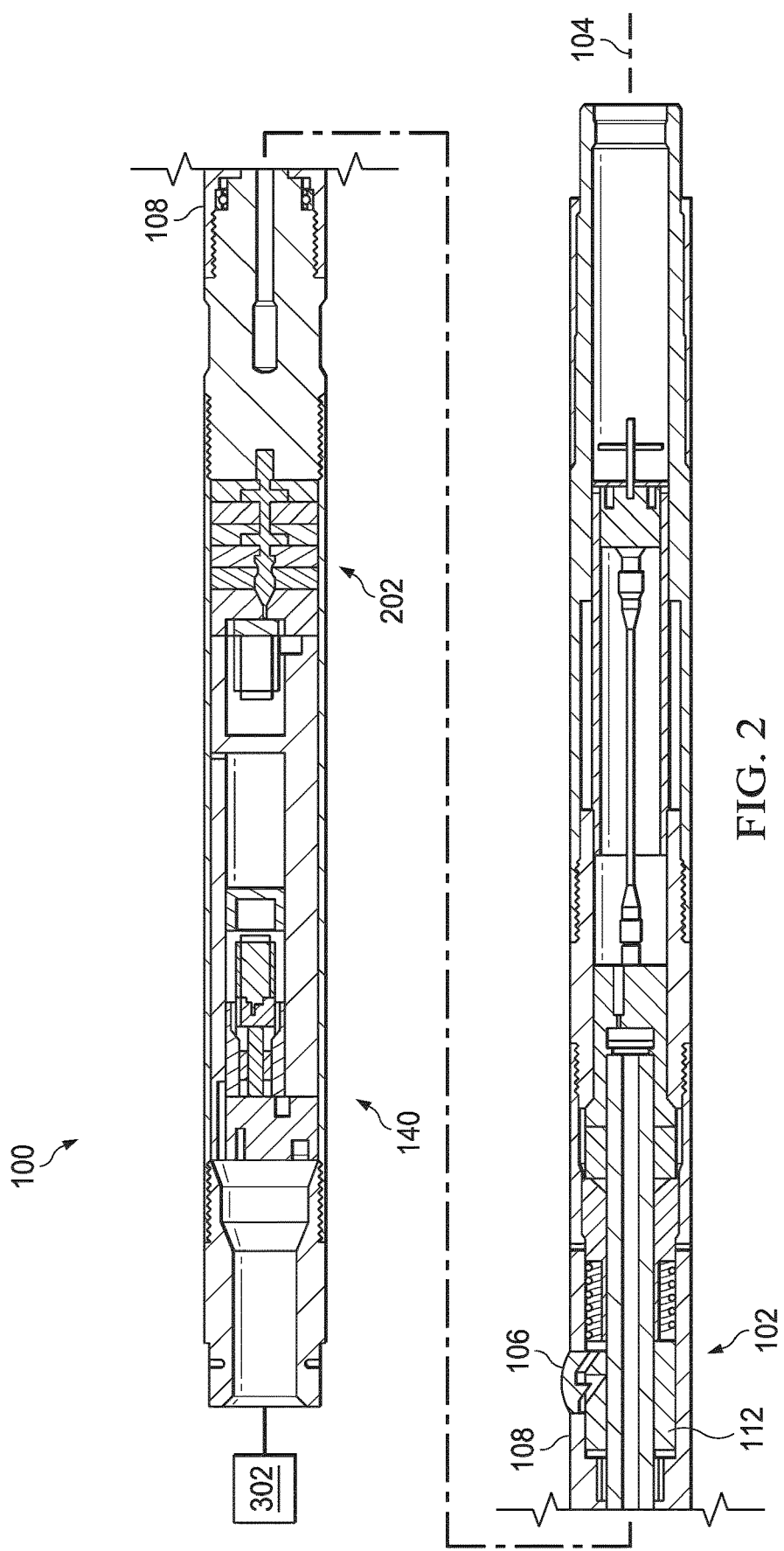
FIG. 2 is a sectional side view of an embodiment of a downhole tool assembly.
Figure 3A:
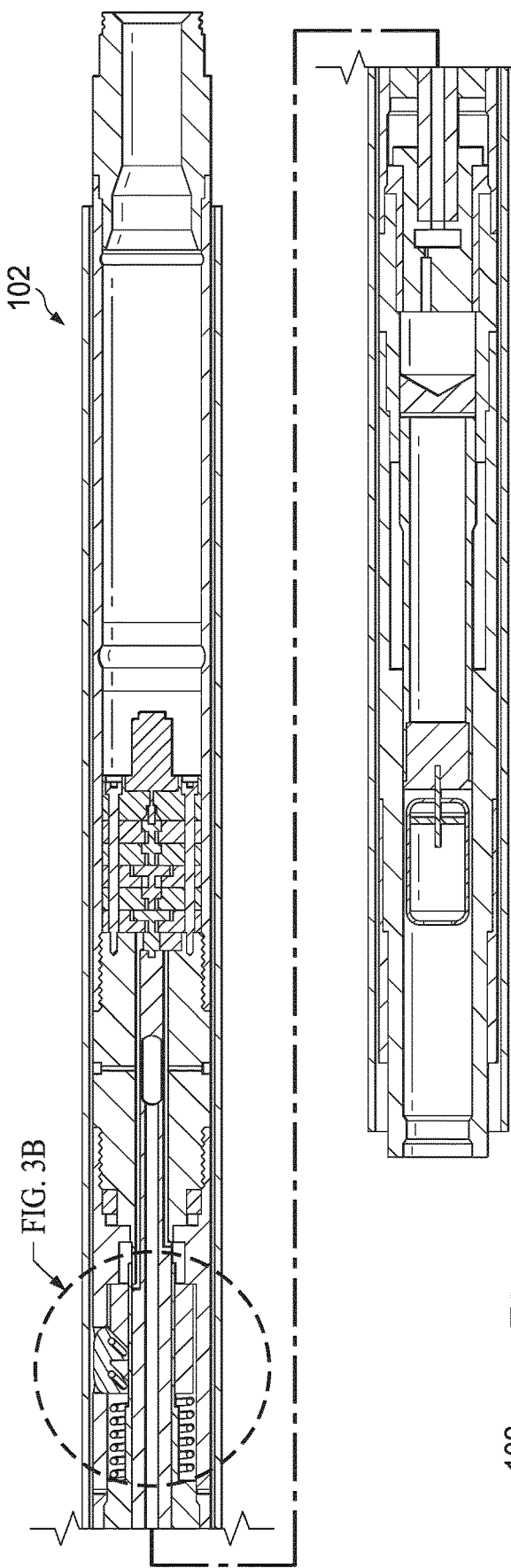
FIG. 3 is a side view of an embodiment of an anchor tool showing dogs in an unlocked position.
Figure 3B:
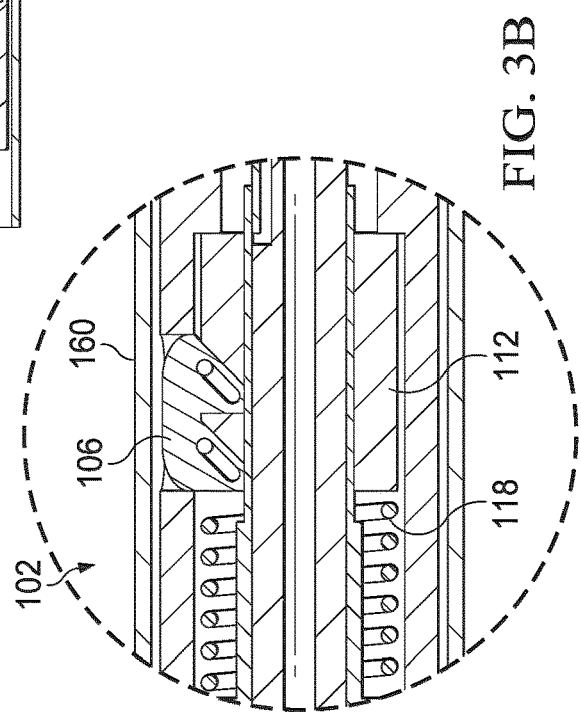

FIGS. 1 and 2 depict examples of a system 100 for downhole operation in a well having a borehole and an axis. The system 100 can include an anchor sleeve 102 having an axis 104 and configured to secure and maintain an axial position of the system 100 in the wellbore. The anchor sleeve 102 comprises dogs 106 that can be hydraulically-actuated. The anchor sleeve 102 can have an unlocked position (FIG. 3) wherein the dogs 106 are at least substantially within the anchor sleeve 102 and are not intentionally engaging the borehole or casing 160 of the borehole. The anchor sleeve 102 also can have a locked position (FIG. 4) wherein the dogs 106 extend radially from the anchor sleeve 102 into direct physical contact with the borehole or the casing 160 of the borehole. For example, the hydraulic force applied to the dogs 106 can be in a range of 0 psi to 3000 pounds per square inch (psi). In another example, the hydraulic force can be up to 30,000 psi.

Figure 5:
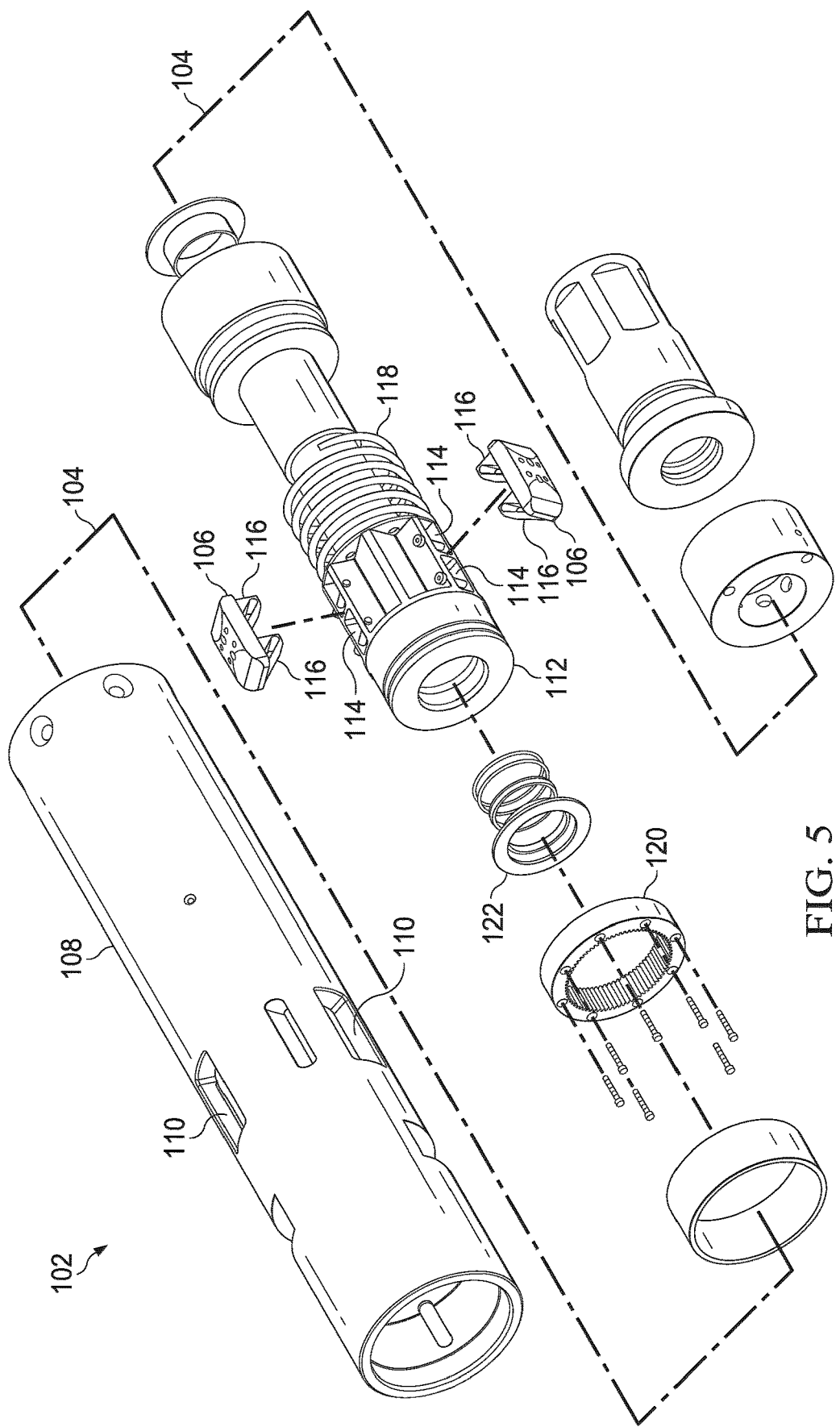
FIG. 5 is an exploded, isometric view of an embodiment of an anchor tool.

In the locked position, embodiments of the dogs 106 of the anchor sleeve 102 centralize the anchor sleeve 102 in the borehole with respect to the axis 104, such that the anchor sleeve 102 (and system 100) is substantially co-axial with the axis of the borehole and/or casing. The anchor sleeve 102 is repeatably resettable between the unlocked and locked positions. The anchor sleeve 102 can include a lock housing 108 (FIG. 5) having open windows 110 in which the dogs 106 reside. The dogs 106 can be movably or slidably mounted to a piston 112 (such as a brass piston) that is axially movable within the lock housing 108. Both the piston 112 and dogs 106 can include diagonal surfaces 114, 116, respectively, relative to the axis 104 on which the dogs 106 contact the piston 112 and lock housing 108, in some versions, and move between the unlocked and locked positions.

In addition, the anchor sleeve 102 can include a piston return spring 118 that can axially move the piston 112 from the locked position to the unlocked position after hydraulic pressure is released. Other components of the anchor sleeve 102 can include a ring gear 120, a bearing 122 and various other bearings, hardware, seals and fasteners, as shown.

Figure 6:
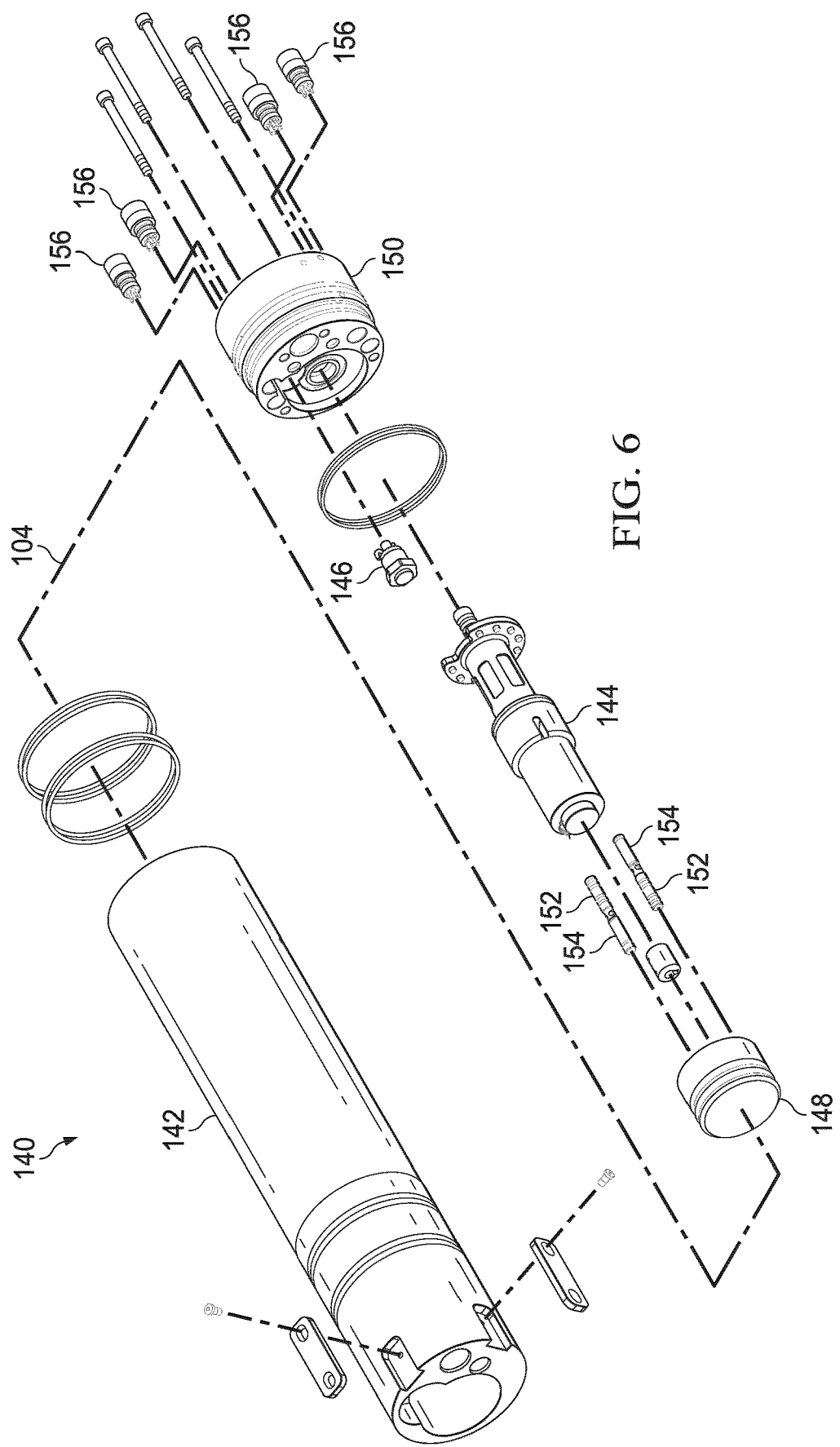
FIG. 6 is an exploded, isometric view of an embodiment of a hydraulic tool.

Embodiments of the anchor sleeve 102 further include a hydraulic system 140 (FIGS. 1, 2 and 6) for actuating the piston 112 and dogs 106. As shown in FIGS. 1 and 2, the anchor sleeve 102 is not necessarily directly axially adjacent to the hydraulic system 140, such that it can be axially spaced apart therefrom. Alternatively, the anchor sleeve 102 can be directly axially adjacent to the hydraulic system 140. Components of the hydraulic system 140 can include a hydraulic reservoir 142, a hydraulic motor 144, an electric solenoid valve 146, a pressure compensation piston 148, a hydraulic manifold 150, a pressure relief valve 152 (e.g., 3000 psi), a check valve 154, electrical bulkhead connectors 156 and various other bearings, hardware, seals and fasteners, as shown.

Figure 7:
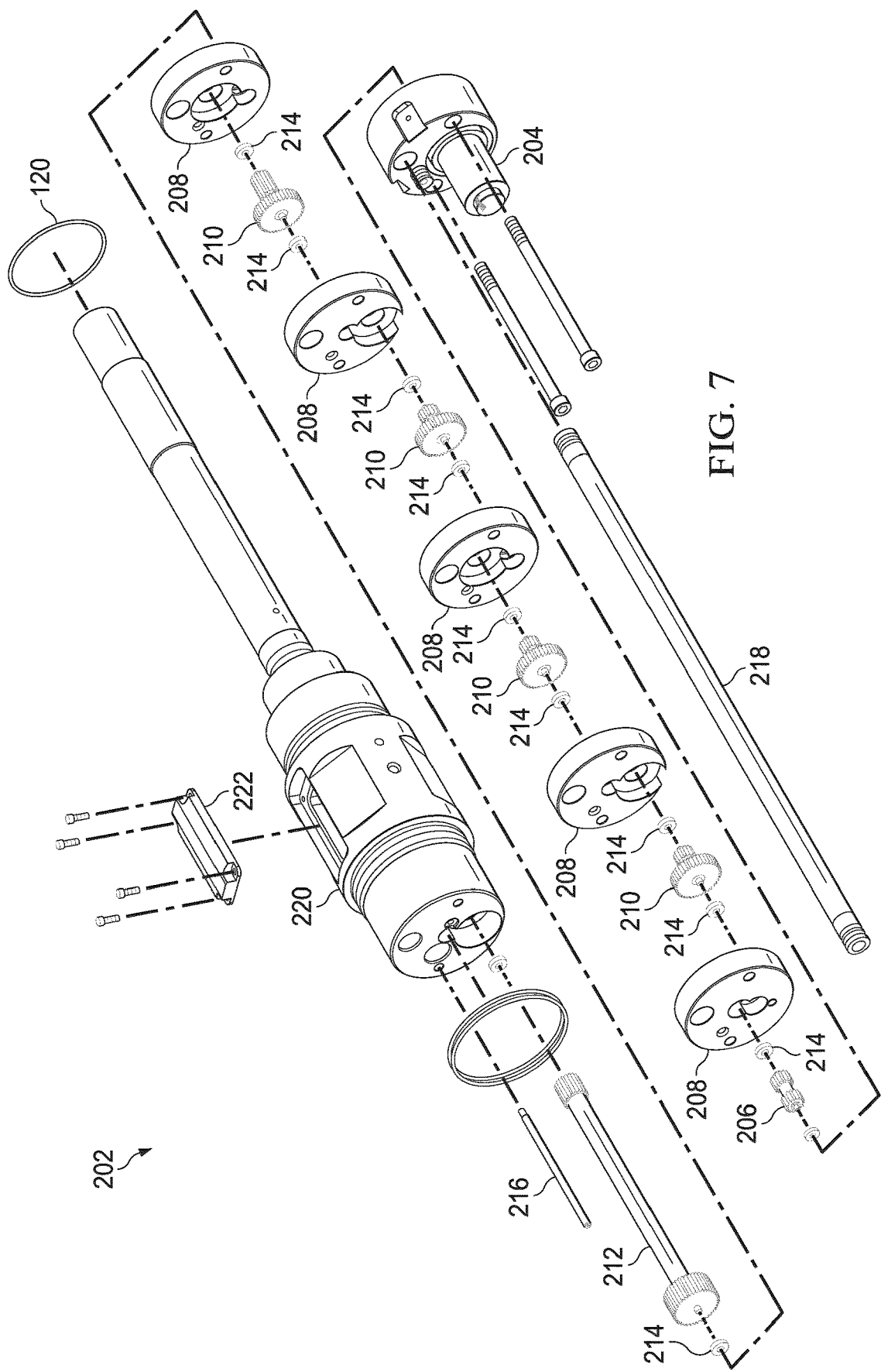
FIG. 7 is an exploded, isometric view of an embodiment of a rotation tool.

As shown in FIGS. 1, 2 and 7, the transmission assembly 202 (in this example) is coupled to the anchor sleeve 102 and to an imaging tool 302. The transmission assembly 202 can be configured to rotate the imaging tool 302 in the borehole to selected circumferential (i.e., azimuthal) angles with respect to the axis 104. The imaging tool 302 (FIGS. 8-10) can include transducers, such as transmitters 304 and receivers 306, that can be configured to image a formation in which the well and system 100 resides.

The transmission assembly 202 (FIGS. 1, 2 and 7) can include a rotation motor 204 having a motor gear 206. The transmission assembly 202 can further include a single stage or multi-stage transmission with transmission spacers 208, gears 210, a spur gear 212, bearings 214, an oil tube 216 (e.g., high pressure) and a wiring tube 218. The transmission also can include a rotation mandrel 220 having a wiring hatch cover 222 and coupled to the ring gear 120 (FIGS. 5 and 7) of the anchor sleeve 102 (in some embodiments). The transmission assembly 202 can include various other bearings, hardware, seals and fasteners, as shown.

Versions of the transmission assembly 202 can rotate the transmission assembly 202 relative to the anchor sleeve 102 when the anchor sleeve 102 is in the locked position. In some examples, when the anchor sleeve 102 of the system 100 is in the locked position, everything attached to and below the transmission assembly 202 (such as the imaging tool 302) can rotate with the transmission assembly 202. In other examples, the transmission assembly 202 can rotate the imaging tool 302 as the system 100 is moving axially within the well.

In some embodiments, the transmission assembly 202 can be configured to rotate at a constant rate, a variable rate, an intermittent rate or only to specific circumferential angles from a stop point in, for example, a plane normal to the axis 104. In one version, the transmission assembly 202 is configured to incrementally rotate the imaging tool 302 by increments as small as less than one degree relative to the axis 104. In other versions the rotation tool can incrementally rotate the imaging tool 302 at larger increments, such as 0 degrees to 360 degrees or more. In addition, the transmission assembly 202 can be configured to rotate the imaging tool 302 at a constant rotational speed of 0.1 degree per minute to 5 degrees per second. Examples of the transmission assembly 202 can have a rotational range of 0 degrees to 400 degrees relative to the axis 104.

Referring now to FIGS. 1, 2 and 8-15, the imaging tool 302 can include at least one of an acoustic imaging system, well-logging tool, downhole seismic array, adaptive acoustic array, active array, passive array, synthetic array focused array or divergent array. The system 100 can further comprise a fiber optic multiplexer 308 (FIG. 1) coupled to the imaging tool 302 for communicating with a device 310 (e.g., a laptop computer) at a surface of the well via fiber optics. In addition, the system 100 can include a data communications line in addition to a fiber optics communications line extending from the surface of the well to the system 100 when it is downhole in the well. The data communications line can be copper-based (or another material). In one example, the data communications line can be redundant for back-up data transmission if the fiber optics is inoperable or damaged. In addition, the data communications line can provide active power delivery downhole.

As shown in FIG. 1, some versions of the imaging tool 302 can include a plurality of transducer sections 312 (e.g., two shown in FIG. 1). The transducer sections 312 can be adjacent to each other (as shown), or the transducer sections 312 can be spaced apart from each other by spacers.

Embodiments of the imaging tool 302 can include a housing 314 (FIGS. 8-15) having one or more open windows 316 for unobstructed access to the wellbore. The transducers 304, 306 can be positioned in the open windows 316. Accordingly, versions of the transducers 304, 306 are not encased with the tool such that they are unobstructed and exposed to an environment of the well.

Figure 8:
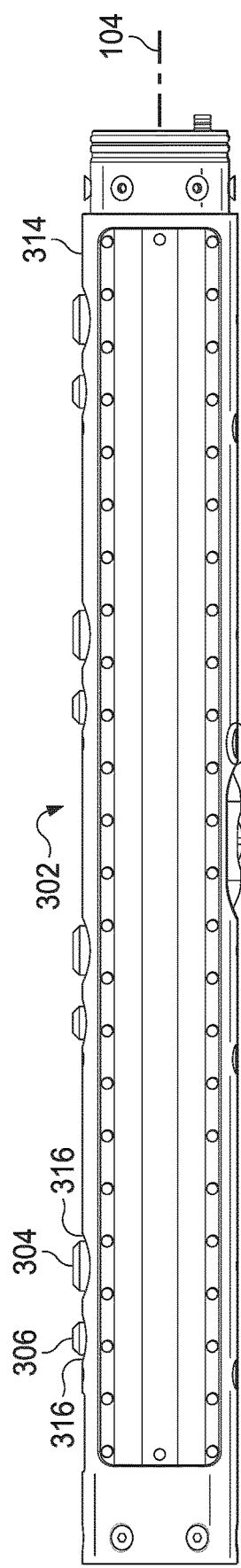
FIG. 8 is a side view of an embodiment of an imaging tool showing transducers in an extended position.
Figure 9:
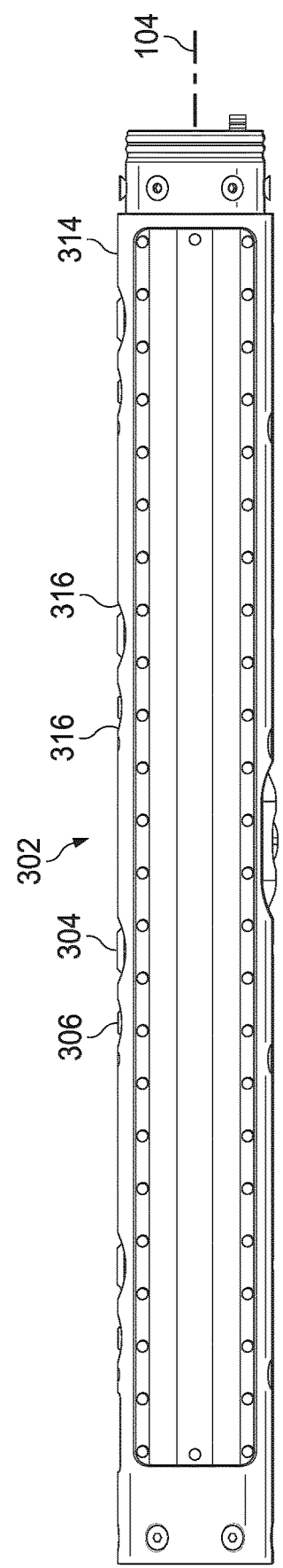
FIG. 9 is a side view of the imaging tool of FIG. 8 showing transducers in a retracted position.
Figure 10:
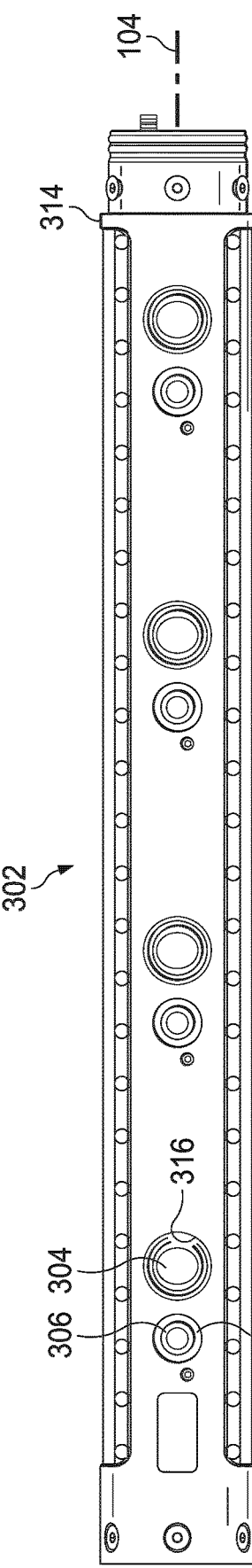
FIG. 10 is a front view of the imaging tool of FIG. 8.
Figure 11:
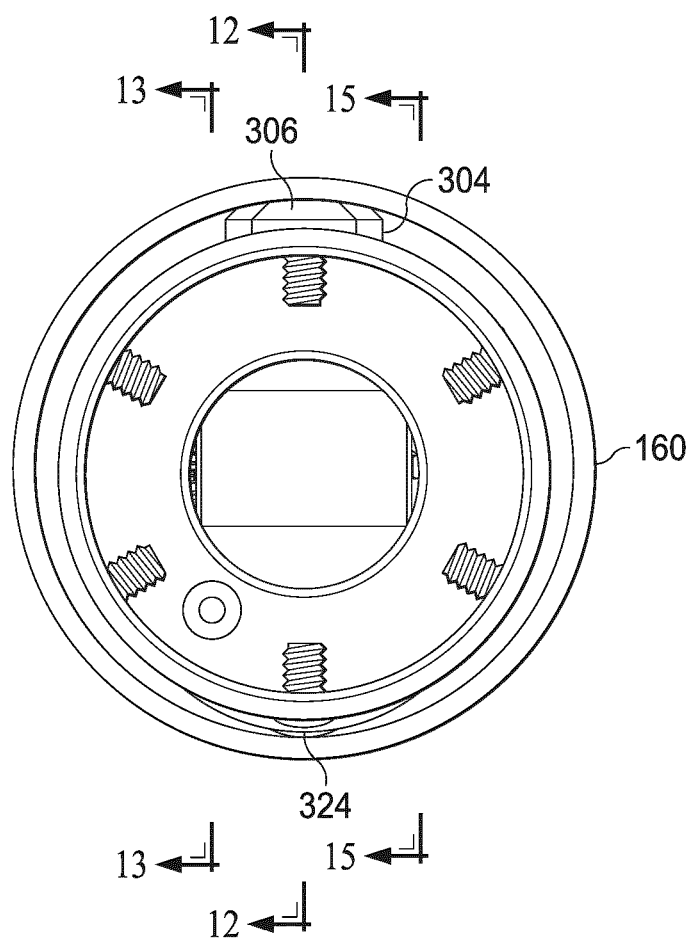
FIG. 11 is an axial end view of the imaging tool of FIG. 8.
Figure 14:
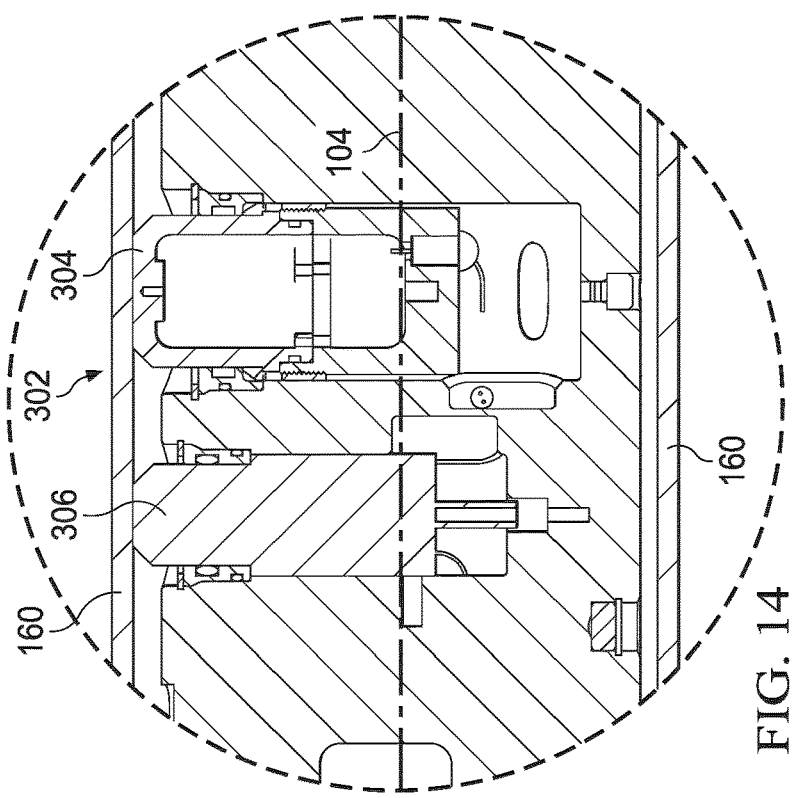
FIG. 14 is an enlarged sectional side view of a portion of the imaging tool of FIG. 12.

As shown in FIG. 9, the transducers 304, 306 can have a retracted position wherein the transducers 304, 306 are at least substantially within the housing 314 and not intentionally contacting the borehole or casing 160 in the borehole. In addition, the transducers 304, 306 can have an extended position (FIGS. 8, 12 and 14) wherein the transducers 304, 306 directly physically contact the borehole or the casing 160 of the borehole. In other words, the transmitters 304 and receivers 306 can be in the retracted position wherein they are substantially radially retracted within the housing 314 relative to the axis 104. In the extended position, they can extend radially outward from the housing 314 relative to the axis 104 and be positioned to directly physically contact the borehole or the casing 160 of the borehole.

In some versions, at least some of the transducers (e.g., the transmitters 304) are hydraulically-actuated between the retracted and extended positions. Other ones of the transducers (e.g., the receivers 306) can be spring-actuated (e.g., lightly sprung) to move to the extended position and gently couple with the casing 160. The transmitters 304 can have a transmitter hydraulic system that is separate from the hydraulic system 140 (FIG. 1) for the anchor sleeve 102. In another version, the transmitters 304 and the anchor sleeve 102 are on the same hydraulic system. Examples of the hydraulic force for the transmitters 304 can be in a range of 0 psi to 3000 psi, depending on a number of variables. The spring force for the receivers 306 can be in a range of 0 pounds of force (lbf) to 20 lbf. A roller 324 (FIGS. 8 and 12)

can be provided on the imaging tool 302 to reduce friction as the imaging tool 302 is rotated within the wellbore.

As described herein, the imaging tool 302 can include transmitters 304 for transmitting imaging signals in the form of acoustic energy, and receivers 306 for receiving return acoustic energy. Versions of the imaging signals can be transmitted at any suitable frequency, such as in a range of 2 Hertz (Hz) to 25 kilo-Hz (kHz), and in some cases in a range of 4-20 kHz, for example. Other frequencies are possible depending on the specific transmitters employed.

The transmitters 304 and receivers 306 can be configured in a linear array, as shown. Alternatively, they can be configured in a non-linear manner, and can range anywhere from a linear configuration to a random configuration, and from 2D to 3D. In addition, the transmitters 304 and receivers 306 can be interleaved in an alternating pattern, as illustrated. Moreover, the transmitters 304 and receivers 306 can be uniformly patterned in a symmetrical configuration. In some versions, the transmitters 304 are identical to each other. In other versions, the receivers 306 are different and can include a combination of geophones and hydrophones.

Versions of the transmitters 304 and receivers 306 can comprise piezostrictive or magnetostrictive materials. In some examples, the transmitters 304 and receivers 306 include, but are not limited to, alloys comprising at least one of Fe, Tb and Py, such as Terfenol-D® (comprising at least one of Tb, Fe and by) or galfenol (Fe and Ga alloy). The tool is able to use any transmitters or receivers that are designed to fit within the tool.

Embodiments of the transmitters 304 can simultaneously emit signals as the receivers 306 receive signals. The system 100 can further include one or more power management modules 320 (e.g., two shown in FIGS. 12 and 13) that can provide functions such as to managing and distributing the power and signals to the transmitters 304. In some versions, the power management module 320 can have a power rating in a range of 500 W to 3000 W.

Figure 15:
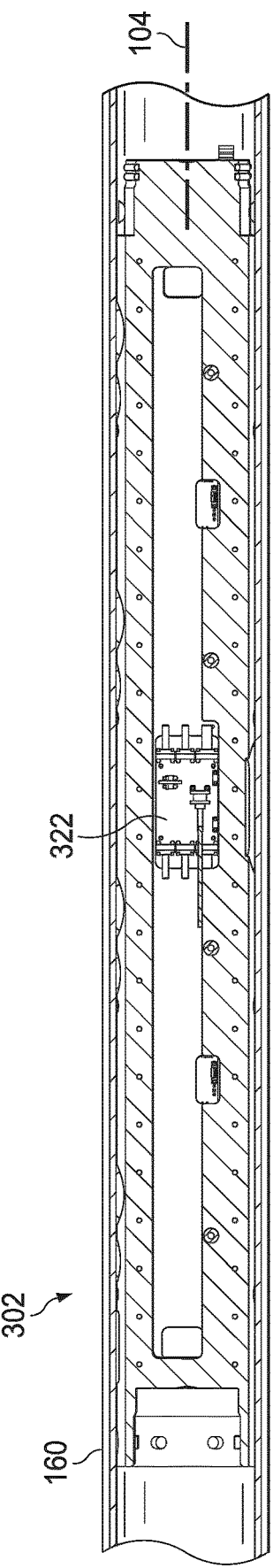
FIG. 15 is a sectional side view of the imaging tool of FIG. 11, taken along the line 15-15 of FIG. 11.

In addition, the imaging tool 302 can include an image module processor 322 (FIG. 15). The image module processor 322 can generate waveforms, such as pre-set waveforms for the transmitters 304 of the imaging tool 302. For example, the pre-set waveforms can comprise a signal of any form within a selected range of frequencies, depending on at least one variable. In other examples, the pre-set waveforms can include at least one of:

P(reset) 01=preset waveform 1=4kHz
P00=2 kHz
P02=8 kHz
P03=12 kHz
P04=Chirp (2-12 kHz), 5 ms, constant current
P05=Chirp (2-12 kHz), 10 ms, constant current
P06=Chirp (2-12 kHz), 5 ms, constant voltage
P07=Chirp (2-12 kHz), 10 ms, constant voltage
P08=Taper Chirp (2-12 kHz), 5 ms, constant current; or
P09=Taper Chirp (2- 12 kHz), 10 ms, constant current; or In addition, a pre-set waveform can include a taper chirp (e.g., 2 Hz to 25 kHz), for longer periods of time. These waveforms are provided only as examples. The waveforms and frequencies can vary depending on the transmitter selected. Moreover, the waveforms can be selected contemporaneously during operation in real-time, such as an operator selecting waveforms that are not pre-determined or pre-set downhole.

As shown in FIG. 1, an example embodiment of the system 100 includes a positioning system 326. The positioning system 326 can provide an azimuth orientation, north-finding solution for the imaging tool 302. In addition, the positioning system 326 can comprise at least one of an accelerometer, gyroscope, magnetometer or dip meter. A method of controlling the axial translation and azimuthal rotation of devices or tools can include but is not limited to following: seismic sensor systems, fiber optic sensor systems, active and/or passive optical systems, laser systems, acoustic systems, ultrasonic sensor systems, electromagnetic sensor systems, active and/or passive electromagnetic sensor systems such as radar/ground penetrating radar systems.

The system also can further comprise a power supply 328 (FIG. 1). The power supply 328 can comprise a voltage source of 300 V to 600V, and variable current output. In addition, the system 100 can include a tool controller section 330, which can include a local controller 332 and motor controller 334, for controlling the anchor sleeve 102, transmission assembly 202 and imaging tool 302. The system 100 can have a device 310 (e.g., laptop computer) at the surface of the well for communicating with the imaging tool 302 and data acquisition. The system 100 can be operated remotely by an operator, or the system 100 can operate autonomously. The system 100 can be configured to provide near-field imaging adjacent the well, and far-field imaging up to, for example, 300 meters from the well, depending on variables such as the aperture of the imaging tool 302 and the transmitter(s) selected.

Other features of the system 100 can further include a cable head connector 402 (FIG. 1) that can be configured to connect to at least one of a wireline, tubing, drill pipe, etc. In this way, the system 100 can be configured to be thereby lowered into and retrieved from the wellbore. The system 100 can be further provided with a roller bearing 404 and bullnose end 406.

Figure 16:
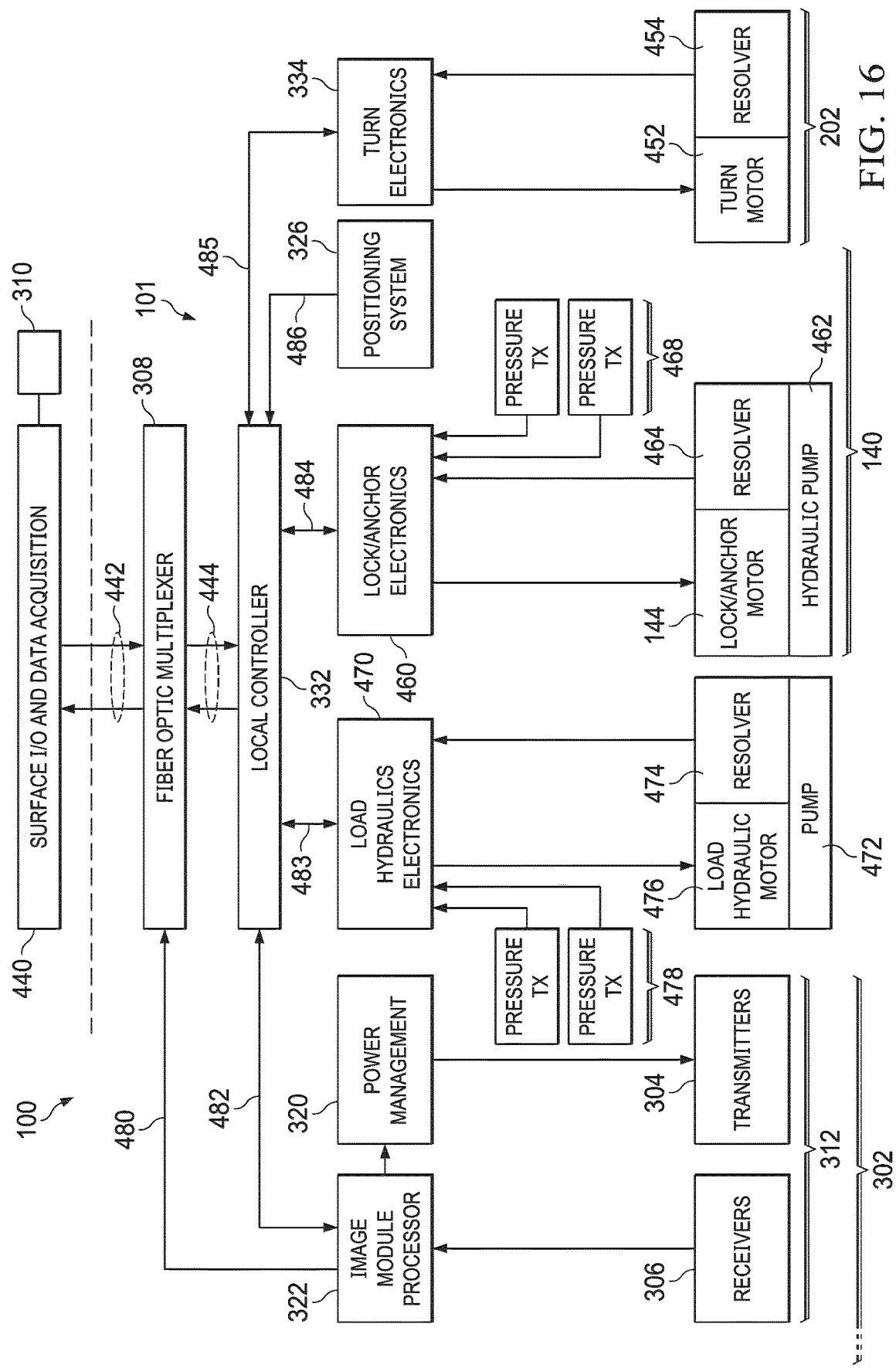
FIG. 16 is a schematic, high level block diagram of an embodiment of a downhole tool system.

Referring now to FIG. 16, a block diagram is shown representing the electrical and control aspects of an exemplary embodiment of the system 100, which includes the downhole tool assembly 101 and a surface I/O and data acquisition module 440 (the "surface module 440") at the surface of the well, which can include or be connected to the device 310 (e.g., a laptop computer). A local controller 332 provides overall control of the downhole tool assembly 101, and communicates to/from the surface module 440 (and thus device 310) by way of the fiber optic multiplexer 308 and communication path 442 which, as described above, can include one or more electrical wires in addition to (or in place of) one or more fiber optic cables. These electrical wires can be used for data communications as well as active power delivery.

The local controller 332 is coupled to the image module processor 322, load hydraulics electronics module 470, lock/anchor electronics module 460, rotation or turn electronics module 334, and positioning system 326, by way of respective communication paths 482, 483, 484, 485, and 486. Each will be described in turn.

The image module processor 322 can communicate with the local controller 332 over bidirectional communication path 482 to receive command and other information from the local controller 332, and to provide status and other information to the local controller 332. The image module processor 322 also can be coupled to the power management module 320 which, in turn, are respectively coupled to one or more corresponding transmitters 304. The command information can include, for example, an indication of the desired waveform (e.g., type, frequency, power level) to be emitted from the transmitters 304, as well as start/stop signals. The image module processor 322 is also coupled to receivers 306 to receive, for example, acoustic signals from each receiver 306, and the image module processor 322 is further directly coupled to the fiber optic multiplexer 308, by way of unidirectional communication path 480, to communicate such imaging signals to the surface module 440 without any buffering and retransmission by the local controller 332. This arrangement is helpful to provide a very high-bandwidth digital communication path from the image module processor 322 to the surface module 440, such that real-time imaging data can be transmitted to the surface and appropriately acquired and processed by the device 310. The image module processor 322, power management module 320, transmitters 304, and receivers 306 can advantageously be disposed within a single transducer section 312 (FIG. 1). An additional instance of the image module processor 322, power management module 320, transmitters 304, and receivers 306 can be disposed within a second transducer section 312, which together can be viewed as being part of the imaging tool 302. As described above, the imaging tool 302 of the downhole tool assembly 101 can include one, or more than one, such transducer sections 312.

The load hydraulics electronics module 470 ("load module 470") communicates with the local controller 332 over bidirectional communication path 483 to receive command and other information from the local controller 332, and to provide status and other information back to the local controller 332. The load module 470 is coupled to a load hydraulic motor 476 for controlling such motor to operate a hydraulic pump 472. A resolver 474 is mechanically coupled to the motor 476 or the hydraulic pump 472 to provide position information to the load module 470. A pair of pressure sensors 478 also provides pressure information to the load module 470. Such pressure information can include a real-time measurement of the applied pressure of the transmitters 304 against a wellbore, so that the load module 470 can appropriately adjust the control to the load hydraulic motor 476. In some embodiments, the load module 470 can be included within the tool controller section 330. In some embodiments, the pair of pressure sensors 478 can be included within a single transducer section 312, In some embodiments, each of the pair of pressure sensors 478 may be included within a corresponding transducer section 312.

The lock/anchor electronics module 460 ("lock/anchor electronics 460" shown in FIG. 16, and hereafter just "anchor module 460") communicates with the local controller 332 over bidirectional communication path 484 to receive command and other information from the local controller 332, and to provide status and other information back to the local controller 332. The anchor module 460 is coupled to a lock/anchor motor 144 ("anchor motor 144" or "hydraulic motor 144") for controlling such anchor motor 144 to operate a hydraulic pump 462. A resolver 464 is mechanically coupled to the anchor motor 144 or the hydraulic pump 462 to provide position information to the anchor module 460. A pair of pressure sensors 468 also provides pressure information to the anchor module 460. Such pressure information can include a real-time measurement of the applied pressure against a borehole or casing within the borehole by the dogs 106 of the anchor sleeve 102 (FIGS. 2, 4), so that the anchor module 460 can appropriately adjust the control to the anchor motor 144. In some embodiments, the anchor module 460 can be included within the tool controller section 330, and the anchor motor 144 can be positioned within the hydraulic system 140. In some embodiments, the pair of pressure sensors 478 can be included within the hydraulic system 140, or within the anchor sleeve 102. In some embodiments, individual pressure sensors 478 can be positioned within the anchor sleeve 102 and the imaging tool 302, respectively, such as in embodiments where the anchor hydraulics is used for both the anchoring tool and the imaging tool and the load module 470 and associated load hydraulic motor 476, hydraulic pump 472, resolver 474, and pressure sensors 478 are not implemented.

The rotation or turn electronics module 334 (i.e., "motor controller 334") communicates with the local controller 332 over bidirectional communication path 485 to receive command and other information from the local controller 332, and to provide status, position, and other information back to the local controller 332. The motor controller 334 is coupled to turn motor 452 for rotating the transmission assembly 202. The turn motor 452 can be viewed as including the rotation motor 204, motor gear 206, transmission spacers 208, and gears 210, all as described above (FIG. 7). The turn motor 452 can also be viewed as corresponding to the rotation motor 204. A resolver 454 is mechanically coupled to the turn motor 452 to provide position information to the motor controller 334. In some embodiments, the motor controller 334 can be included within the tool controller section 330, and the turn motor 144 can be positioned within the hydraulic system 140 (FIG. 2). Other configurations are contemplated. For example, the turn motor 452 and the motor controller 334 can reside within the same modular section of the downhole tool assembly 101.

The positioning system 326 communicates with the local controller 332 over unidirectional communication path 486 to provide location-related information to the local controller 332. The positioning system 326 can provide an azimuth orientation, north-finding solution for the imaging tool 302. In addition, the positioning system 326 can comprise at least one of an accelerometer, gyroscope, magnetometer, and dip meter, In some embodiments, the positioning system 326 can be disposed with the power supply 328 in the same modular section of the downhole tool assembly 101 (FIG. 1), which advantageously can be positioned adjacent the tool controller section 330 to reduce cabling interconnection lengths, although other placement configurations are also contemplated which can provide for communications with the local controller 332.

The functional partitioning described in regards to FIG. 16 was chosen to more easily describe the operation of and coordination of various sub-systems within the exemplary downhole tool assembly 101, but such partitioning is merely an example and is not required. For example, each of the various control modules, such as image module processor 322, load module 470, anchor module 460, and turn module 334, can individually, or in any combination or sub-combination, be viewed as being part of the local controller 332.

In some embodiments, the fiber optic multiplexer 308 can be configured to transmit and receive respective bit-serial data streams to and from the surface module 440. Such an arrangement can utilize a respective fiber for each direction, but can also utilize a single fiber for both directions using different light frequencies, or using time multiplexing. In some embodiments, the fiber optic multiplexer 308 can be configured to multiplex between several inputs, corresponding to the communication path 444 from the local controller 332 and the unidirectional communication path 480 from the image module processor 322, and perform a parallel-to-serial conversion for transmission up the wellbore to the surface module 440, and analogously configured to perform a serial-to-parallel conversion of data received from the surface module 440, then communicate the parallelized data to the local controller 332 by way of the communication path 444. In other embodiments, the communication path 442 can include multiple fibers, and be configured to provide a parallel data channel conveyed over the fiber optic communication path 442, in one or both directions.

In various embodiments, one or more of the communication paths 480, 482, 483, 484, 485, 486 can be implemented to convey either serial or parallel data, using one or more electrical cables and/or optical fibers/wireless telemetry systems.

Having thus described exemplary embodiments of a suitable downhole tool, a brief return to conventional techniques is warranted to provide additional context for the disclosed techniques. Sonic logging (e.g., acoustic logging) provides a formation's interval transit time, which is a measure of a formation's capacity to transmit seismic waves which varies with lithology and rock textures. High resolution microscale seismic images of structural features in the near-borehole region (10 to 15 meters (m)) can be obtained with acoustic logging. Conventional seismic-processing techniques are used to extract compressional and shear reflections/waves from the data. Sonic logs use signals to identify bed boundaries, thin beds, fractures, and faults in open hole and cased wells. Seismic processing is a form of imaging that uses the reconstruction of multiple reflected waves, whereas a sonic logging tool acquires a single signal and thus no image reconstruction is possible.

Conventional logging tools and techniques do not focus transmitted energy to generate a virtual point source remote from the borehole. "Imaging" or acoustic logging can measure the property of speed of sound of the formation with compressional waves (P-waves) and sometimes sheer waves (S-waves). As noted, the average depth of penetration of an acoustic logging tool is between 2.5 centimeters (cm) and 25 cm. With lower frequencies, the signals can be transmitted deeper into the formation but not much more than a meter or two.

Typical cross-borehole seismic systems (using two boreholes) can image up to 50 meters into the formation from the downhole tool. The depth to which conventional surface-based seismic is able to image is directly related to the geometry of the acquisition design. As depicted in FIG. 18, the longer the string of geophones and the selected distance from the seismic source, the deeper it will be possible to image. This is dependent on the properties of the rock formations to be imaged (density, water saturation, etc.) as they affect the velocity of sound moving through the formation.

Returning now to the techniques disclosed herein, embodiments of the system 100 can communicate imaging data in real-time with the device 310. The system 100 can be configured to image the formation from a perspective of a virtual point source (again VPS) that is positioned at a selected (i.e., computed and focused) distance from the well in which the system 100 resides. The distance at which the VPS may be positioned is determined by the size of the array aperture (i.e., length of the imaging section of the tool, the number of transducers, and potentially the number and length of spacers between each segment containing the transducers). One or more techniques and capabilities of the system 100 can be utilized to sense return acoustic energy and thus acquire return acoustic data for image reconstruction such as, for example, angular and vertical beamforming, synthetic aperture sensing, and the use of virtual point sources. As a result, the system 100 can be viewed as a seismic-based imaging tool for imaging a formation at a distance from the borehole in which the system 100 is located, rather than an acoustic logging tool that can record a signal related to the density or acoustic velocity of the formation in a region immediately surrounding the borehole, within 2.5 cm to 25 cm of the acoustic logging tool. Using embodiments of the system 100, imaging up to 100 meters into the formation has been achieved.

A virtual point source (VPS) can be created within the formation by transmitting acoustic waves from one or more real sources, located on the axis of the downhole tool, into the formation at right angles to the tool axis. With multiple transmitters (real sources) emitting acoustic energy (e.g., acoustic (pressure) waves), outbound acoustic energy is launched into the formation and focused on a desired location or volume within the formation. The location or volume of a virtual point source (e.g., computed as described below) will experience a pressure change due to the summation (constructive wave interference) of waves at the desired location or volume. Points other than the VPS location will experience destructive wave interference and therefore will not contribute significantly to the return acoustic energy that emanates from the VPS. The receivers along the axis of the tool are used to collect the return wave data from each VPS.

Time delays are the basis of phasing an array or beamforming. The time delays used to focus the acoustic energy for each virtual point source (VPS) are calculated based on the location of transducers and receivers, number of VPS's and location referenced to the tool, type of waveform being used to either focus or diverge the beam of acoustic energy, and physical properties of the formation such as velocity. First, the distance between each transducer (Tx) and VPS can be estimated using Pythagoras's theorem:

$$D_{ij} = \sqrt{(X\_Tx_j - X\_VPS_i)^2 + (Z\_Tx_j - Z\_VPS_i)^2} \qquad (1)$$

where X_Tx and Z_Tx correspond to the X and Z coordinate of the transducers, X_VPS and Z_VPS correspond to the X and Z coordinate of the VPS's, i is the number of the virtual point source and j is the number of the transducer.

Then, delays are computed by subtracting the minimum distance D_min to each distance $D_{ij}$ and using a constant velocity:

$$\text{Delay}_{ij} = \frac{D_{ij} - D_{min}}{V_{fm}} \qquad (2)$$

where $V_{fm}$ corresponds to the velocity of the formation. In certain embodiments the actual value of the formation velocity can be an assumption and thus this value represents a rough estimate. As can be appreciated, the calculated delay will be zero for the location corresponding to the minimum distance, and the respective calculated delays for other respective locations are offset delays. For generation of a VPS as described above, a solution is obtained directly, unlike other methods that require modeling or iterating to optimize a solution for the positioning of the VPS's.

FIGS. 19-22 include diagrams of several embodiments depicting arrays of transducers or transducer elements that can be focused and/or steered using time delays. In some examples, each array element is a transmitter on the body of the tool.

In exemplary use, the downhole portion of the system 100 can be lowered to a particular depth, anchored in the borehole or casing, the imaging tool (e.g., imaging section 302 of the downhole tool 101) rotated to orient the transducers to a particular circumferential (azimuthal) angle, and the timing of transmitted signals from the various transducers coordinated to generate a focused steered beam of acoustic energy, and sense the return acoustic energy to create a first set of image data, which is transferred via a telemetry method or otherwise communicated to the device 310. Using phasing techniques, with the tool anchored at a particular depth within the borehole and held at a constant azimuth, the tool can create a plurality of virtual point sources in the direction pointed by the transmitters 304, with each virtual point source residing in a plane in which tool axis and transmitters 304 reside, though the distance from the tool to each virtual point source need not be the same. The downhole tool can then be un-anchored, moved vertically in the well to a higher or lower depth, and re-anchored so that an additional set of image data can be sensed. This can be repeated an arbitrary number of times, and the beam angle at each respective vertical depth can be configured to triangulate to (i.e., converge at) the location of the desired virtual point source. The type of transducers, the number of transducers, and the distance between transducers (e.g., number of transducer sections 312, spacing between transducer sections 312, and length of each transducer section 312), can be selected to control the resulting beam steering and formation interrogating properties (i.e., setting the array aperture of the tool). The image data can then be processed by the device 310.

In another example, the downhole portion of the system 100 can be lowered down (or raised up) art uncased borehole or within a cased borehole without stopping to anchor the tool, and imaging data sensed continuously. The imaging tool can be rotated to orient the transducers to a particular circumferential angle or azimuth during this descent or ascent, but in other examples the imaging tool can be rotated during the descent/ascent. In some examples the beam angle can be varied during the descent/ascent, so that the beam angle at each respective vertical depth triangulates to the location of the desired virtual point source. Imaging a formation in this manner could generate very large datasets that could make the image reconstruction difficult with current computational resources, although future computing advances will inevitably mitigate this.

In yet another example, rather than moving the tool up and down the borehole without stopping to create a VPS, beamforming is applied from a locked position to image the formation ,or to create VPS's at desired angle above and below the tool, with the angle being dependent on the aperture (length and spacing of the transducers on the imaging module) of the tool. In other words, a target zone can be selected, the tool positioned and locked within the wellbore, the transducer section rotated to face the direction of interest, and the data acquisition then carried out. This would be computationally more efficient than imaging a full 360-degree zone around the well-bore.

The system 100 also can communicate to a computer, the imaging data received from any VPS generated by the imaging tool 302. In other words, the VPS acts as a virtual transmitter. In one example, the VPS can be located within a non-existent "virtual" well in the formation to image the formation in the vicinity of that virtual well. The distance from the well to the VPS can be in a range of 1 meter to 300 meters, depending on variables such as the aperture of the imaging tool 302.

The imaging tool 302 can be configured to physically vibrate the formation at the VPS. In addition, the imaging tool 302 can be configured to capture return acoustic energy from the VPS which signals can be used to characterize parameters of the formation at the VPS and between the VPS and the tool. For example, when generating a VPS at a location or volume distant from the borehole in which the tool is located, the parameters can include at least one of a P-wave to S-wave velocity ratio (Vp/Vs) to derive at least one of an elastic modulus of the formation, permeability or porosity of the formation.

The imaging tool 302 can create shear waves by moving the focal point (VPS) supersonically to create a vibration of the rock particles at that point. In particular, in some example cases focusing outbound acoustic energy on a location or volume may include focusing a first portion of the first outbound acoustic energy at a first location with the volume, and then focusing a second portion of the first outbound acoustic energy at a second location within the first volume, thereby creation a pressure wave within the volume. That is, in some cases focusing the outbound acoustic energy on a location or volume of the VPS is sufficient to create a return acoustic energy, but in in other case the focal point may be shift (e.g., supersonically) a short distance (e.g., ¼ to ⅛ wavelength of the acoustic energy) to facility more efficient creation of shear waves emanating from the virtual point source.

The imaging tool can focus an acoustic beam on a point in the formation to create a VPS at the desired point. Supersonic movements of the VPS create an overpressure at that particular location in the formation rock. The overpressure in turn induces mechanical waves, of which one mode is shear waves. The magnitude and speed of the oscillations of the VPS depend on the number of input pressures such that they will vary with the amplitude of the pulse wave and the number of pulses focused on the point. In certain embodiments, the imaging tool can focus on a point in the formation to create a VPS at that point, and then shift the focal point supersonically to induce a shear wave in the rock. The minute movements of the focal point can create a shear wave sufficient to vibrate the rock particles. The movement of the focal point is dependent on at least one of the density of the rock, the speed of sound in the rock, the frequency of the transmitted acoustic wave, the amplitude of the transmitted acoustic wave, or the number of pulses of the transmitted acoustic wave.

The shear waves may be controlled (e.g., focus the acoustic energy up and down a fracture) such that when focused on a fracture zone, they can be used to open or close the fracture depending on the circumstances (e.g., to close a fracture to avoid infiltration of water to an oil zone, or to open a fracture to allow more oil to flow and improve production without fracturing using water, sand or other chemically-based fracturing agents).

In certain embodiments, system 100 can include up to 32 transmitters and receivers. The system 100 is not limited to 32 transmitters and receivers, as its modular design provides flexibility to work with a virtually unlimited number of transmitters and receivers. However, using a system with at least 32 transmitters and receivers, a focal point at a distance within range of the acoustic transmission from the tool 302 can create a VPS which can in turn trigger minute vibrations (i.e., resonance of formation particles at the location of a virtual point source) of the formation at that focal point and thereby create a shear wave which may be used to image the formation at a distance beyond the borehole containing the tool. Depending on the intensity of the focused beam and the density of the rock, the VPS becomes a new acoustic source which creates acoustic waves that emanate outward from that point. The shear wave may be used to get the spectral properties of the formation by inducing resonance of the formation. Then elastography (elasticity imaging methods) can be utilized to determine the desired parameters or properties of the formation, including the elastic modulus, permeability, and/or porosity of the formation. As with conventional seismic wave reflection, a set of pressure pulses (e.g., acoustic energy) is returned from the focal point due to rock particle displacement. Other properties that can be determined include density and velocity of sound in the formation.

With respect to resonance, in some example methods the tool focuses a first portion of the first outbound acoustic energy at a first frequency on the location or volume of the VPS. The tool then focuses a second portion of the first outbound acoustic energy at a second frequency on the location or volume of the VPS. Based on the return acoustic energy from the VPS, the system (e.g., device 310) may determine the resonant frequency of the formation at the location or volume of the VPS. In some case two or more discrete frequencies are focused to the location or volume of the VPS, and the system determines the resonant frequency by eventually focusing outbound acoustic energy at the resonant frequency on the location or volume of the VPS. In other cases, and as alluded to above, the outbound acoustic energy may be a continuous tone that sweeps (either from higher to lower or vice-versa) a plurality of frequencies between a first frequency and a second frequency. Based on amplitude of the return acoustic energy the device 310 may determine the resonant frequency of the location or volume of the VPS (e.g., the sweep frequency producing higher return acoustic energy amplitude indicative of the resonant frequency). In other cases, the outbound acoustic energy may be in the form of one or more chirps or tapered chirps as discussed above, and again amplitude of the return acoustic energy may indicate resonant frequency of the location or volume of the VPS. In various embodiments, a plurality of transmitters and receivers can be used. Such transmitter and receivers can be either regularly or irregularly spaced. Specifically, various numbers of transmitters and receivers can be used to achieve desired image resolution at appreciable distances from the borehole. The number of transmitters does not necessarily need to match the number of receivers. In some examples, more transmitters than receivers can be used, and there could be unused transmitters on the tool. Alternatively, there could be unused receivers on the tool, such as when there are more receivers than transmitters. The configuration selected can depend on the timing of data acquisition geometry of the system, performance desired, imaging to be performed, among other variables. It is possible to acquire data with a single transmitter and a single receiver, but the use of more transmitters and receivers results in higher density data and better/higher resolution images. Another configuration for borehole imaging (e.g., wireline well logging, which may be considered to be different from seismic imaging) could include one transmitter and four receivers. In some cases where parametric imaging (described more fully below) is to be implemented, two transmitters could be used with one to four receivers.

However, beam steering (e.g., to create a VPS) uses an array of transmitters in order to phase (i.e., time delay) the waveforms being transmitted from each transmitter so that they focus at the desired location or volume in the formation. The outbound acoustic energy can be transmitted in a timed sequence (e.g., the first transmitter sends, then the second, then the third, etc.). However, the transmitters do not necessarily need to transmit in the order in which they are situated on the tool. It can be appropriate to transmit, for example, a waveform from the third transmitter, then the first, then the tenth, then the second, etc., depending on the goal and design of the imaging project.

Because the virtual point sources are created in the formation remote from the borehole in which the imaging system 302 is located, it is not necessary to use range-gating/time-gating or redatuming in order to position the virtual sources at the location of the receivers. A virtual borehole can be created, at any selected distance from, and at any azimuth about, the axis of the borehole containing the system. That is, a plurality of virtual point sources may be created along a path within the formation, the path thus being the virtual borehole. Using the virtual borehole, 3D imaging remote from a single borehole can be achieved, without requiring two separate boreholes to achieve imagery remote from one of the boreholes (i.e., such as that previously associated with cross-borehole tomography), to thus achieve "virtual" cross-borehole tomography.

Because the system is positioned down-hole in the borehole and, by choice, closer to the formation of interest and below any overburden, acquisition issues related to imaging through complex overburden are eliminated. The return acoustic energy from the virtual point sources result in real traces collected by the receivers, therefore many standard seismic approaches for image reconstruction and analysis (e.g., Kirchhoff migration) can be utilized. It is not necessary to interpolate, convolve or cross-correlate the traces to create new virtual traces in order to improve image resolution, as all of the traces are real. In other words, real data points are collected and used reconstruct in the image. High resolution imaging with this tool and the application of VPS's is possible without having to interpolate, convolve, or cross-correlate traces, or use synthetic traces, to improve the resolution of the imagery.

Nevertheless, the system 100 may be used in actual cross-borehole tomography, but with better results than conventional cross-borehole tomography. That is, the tool 100 in a first borehole may create virtual point sources between the first borehole and second borehole spaced apart from the first borehole. The virtual point sources may be created in a plane in which both boreholes resides (e.g., directly between the two boreholes). However, virtual point sources may also be created at locations or volumes on either side of the plane in which both boreholes reside, and may also be created on the far side of the second borehole (e.g., created at locations or volumes that are not between the two boreholes). Thus, in example embodiments the outbound acoustic energy may be focused on location or volume in relation to a second borehole, and the return acoustic energy can be send by sensors disposed in the second borehole spaced apart from the first borehole.

Further still, while there may be many advantages to created virtual point sources within a formation surrounding a first borehole, and likewise sensing return acoustic energy either in the first borehole or a second borehole spaced apart from the first borehole, in yet still other example embodiments the return acoustic energy created by a virtual point source may be sensed by seismic sensors disposed at the surface of the Earth.

Imaging embodiments include one or more real traces which are acquired as real data. The algorithm used for these purposes can be similar to the algorithm disclosed in U.S. Pat. No. 7,819,805, FIGS. 20-21, to Davies, et al, which is incorporated herein by reference in its entirety. instead of storing and processing each page of data (as disclosed in the Davies patent), other embodiments can store and process each pixel directly. The image reconstruction algorithm can be based on geometry. In this context, the algorithms can be more efficient computationally, except that every pixel can be processed, which arguably adds computational expense, but which can be mitigated by the number of (and choice of) processors. Other image reconstruction algorithms can be simplified due to less of a need to use range-gating/time-gating, redatuming, interpolation, convolution and/or cross-correlation.

Consequently, the formation can be more accurately and realistically imaged, and only one well is needed to image the formation where normally, multiple wells would be required to image the formation. The spectral properties of the formation can be obtained by inducing resonance in the formation. By inducing resonance, the concepts of elastography (elasticity measurement and imaging methods) using the shear waves (i.e., an external mechanical force) created by the induced resonance in the rock at a desired location may be used.

Embodiments of the system 100 can utilize any of a wide variety of transducers. However, a brief discussion of certain transducer aspects warrants discussion. Acoustic interrogation of subsurface rock formations for imaging and characterization of subsurface features face challenges related to the size and power of the acoustic sources, the speed and fidelity of data transmission through the wireline cable, and the depth of signal penetration into the formation. High frequency energy waves typically generated using small transducers do not penetrate very deeply into the formation, while low frequency energy waves typically generated by much larger transducers do penetrate deeply into the formation.

In addition, high-frequency transmitters are generally smaller than low-frequency transmitters and therefore, they fit into smaller diameter boreholes more easily. Consequently, parametric imaging can be used to create low frequency waves so that the transducers fit more conveniently into small diameter tool bodies. Parametric imaging can include two or more high frequency signals focused at a point in the formation such that the difference or beat frequency between the two frequencies is a low frequency, For example, F1=70 kHz, F2=71 kHz, and F2−F1=F3 of 1 kHz. The resulting low frequency signal can penetrate deeper into the formation than high frequency signals. Parametric imaging is just one method of creating lower-frequency acoustic waves that the system 100 can implement, but is not required for creating a virtual point source. In some cases, focusing outbound acoustic energy may involve having each transmit or send a signal having two or more distinct frequencies, and wherein a beat frequency as between the two distinct frequencies is less than 1000 Hertz. In yet still other cases, each transmitter or acoustic source may send outbound acoustic energy having a single frequency, but different acoustic sources may send outbound acoustic energy having different frequencies. Thus, a first plurality of acoustic sources may send signals having a first frequency, and simultaneously a scone plurality of acoustic sources may send signal having a second frequency different than the first frequency, such that a beat frequency as between the first and second frequency is less than 1000 Hz.

Embodiments of transducers disclosed herein can include a unipole transducer The unipole transducer sends out a signal only in a single direction. The transmitters disclosed herein do not necessarily have or need a waveguide as they can be designed to function as a unipole transmitter with the wave being propagated in a single direction only.

Embodiments of the system 100 disclosed herein have great flexibility and adaptability to different types of wellbores such as horizontal, deviated, cased, and open-hole. This stands in contrast to many existing downhole imaging tools, which are inflexible and not adaptable to different types of wellbores. Such existing tools are either permanently configured to acquire data in a specific manner, or they are configured for each use prior to being lowered into the borehole.

The following embodiments are contemplated, and including combinations thereof.

One example embodiment is a method comprising imaging a formation around a first borehole, the method comprising: focusing first outbound acoustic energy, launched from a tool with the first borehole, on a volume within the formation spaced away from the first borehole, the focusing creates a first virtual point source (VPS) that creates a first return acoustic energy; receiving the first return acoustic energy from the first VPS at a plurality of seismic sensors; and determining a parameter of the formation between the first VPS and a location of the seismic sensors using the first return acoustic energy.

In some embodiments, the focusing the first outbound acoustic energy further comprises creating the first outbound acoustic energy from an array of acoustic sources spaced along the tool, the array of acoustic sources activated as a phased array to focus the first outbound acoustic energy on the first VPS.

In some embodiments focusing the first outbound acoustic energy further comprises sending, from each acoustic source in the array of acoustic sources, a signal having two distinct frequencies, and wherein a beat frequency as between the two distinct frequencies is less than 1000 Hertz.

In some embodiments, focusing the first outbound acoustic energy further comprises: sending, from a first plurality of sources of the array of acoustic sources, signals having a first frequency; and simultaneously sending, from a second plurality of sources of the array of acoustic sources, signals having a second frequency different than the first frequency; wherein a beat frequency as between the two first and second frequencies is less than 1000 Hertz.

In some embodiments, receiving the return acoustic energy further comprises receiving by the plurality of seismic sensors disposed on the tool within the first borehole.

In some embodiments the method further comprises: focusing second outbound acoustic energy, launched from the tool with the first borehole, on a volume within the formation spaced away from the first borehole, the focusing creates a second VPS different than the first VPS, the second VPS creates return acoustic energy; receiving the second return acoustic energy from the first VPS at a plurality of seismic sensors; and determining a parameter of the formation between the second VPS and the first borehole.

In some embodiments, the method further comprises holding the tool at an azimuthal direction that is constant for both the focusing of the first and second outbound acoustic energies, and holding the tool at a depth that is constant within the borehole for both the focusing of the first and second outbound acoustic energies.

In some embodiments, the method further comprises changing depth of the tool within the borehole between focusing the first outbound acoustic energy and focusing the second outbound acoustic energy.

In some embodiments, the method further comprises: rotating the tool about a tool central axis from a first azimuthal direction to a second azimuthal direction; and then focusing second outbound acoustic energy, launched from the tool with the first borehole, on a volume within the formation spaced away from the first borehole, the focusing creates a second VPS different than the first VPS, the second VPS creates return acoustic energy; receiving the second return acoustic energy from the first VPS at a plurality of seismic sensors; and determining a parameter of the formation between the second VPS and the first borehole.

In some embodiments, focusing the outbound acoustic energy further comprises: focusing a first portion of the first outbound acoustic energy at a first frequency; and then focusing a second portion of the first outbound acoustic energy at a second frequency; wherein determining the parameter further comprises determining a resonant frequency of the volume of the first VPS.

In some embodiments focusing the first portion and focusing the second portion further comprising sending a continuous tone that sweeps in frequency between the first frequency and the second frequency.

In some embodiments, focusing further comprises: focusing the first outbound acoustic energy as first chirp; wherein determining the parameter further comprises determining a resonant frequency of the volume of the first VPS.

In some embodiments, receiving the return acoustic energy further comprises receiving by the plurality of seismic sensors disposed in a second borehole spaced apart from the first borehole.

In some embodiments, receiving the return acoustic energy further comprises receiving by the plurality of seismic sensors disposed at the surface of the Earth.

Other embodiments are contemplated, including the following enumerated embodiments, and including combinations thereof.

In one embodiment for a method using a downhole tool within a single borehole for imaging a geologic formation in a region remote from the single borehole, the method includes: focusing acoustic energy to create a virtual point source (VPS) at a first location in the formation remote from the borehole, using a plurality of phase controlled transducers of the downhole tool, to resonate the rock formation at the first VPS location; receiving signals, using a plurality of receivers of the downhole tool, from the resonating rock at the first VPS location in the formation; communicating the received signals to a processor; and determining, using the processor and the received signals, at least one parameter of the formation at the first VPS location.

In some embodiments, the method further includes varying the phase control of the plurality of transducers to cause the VPS to be supersonically repeatedly moved between the first location and a second location that is an offset distance from the first location, to create a shear wave in the formation at the first VPS location.

In some embodiments, the at least one parameter includes an elastic modulus of the formation.

In some embodiments, the offset distance is determined based upon at least one of the density of the rock, the speed of sound in the rock, the frequency of the transmitted acoustic wave, the amplitude of the transmitted acoustic wave, or the number of pulses of the transmitted acoustic wave.

In some embodiments, the method further includes: focusing acoustic energy to create a second VPS at a corresponding second location in the formation remote from the borehole, using the plurality of phase controlled transducers of the downhole tool, to resonate the rock formation at the second VPS location; receiving signals, using the plurality of receivers of the downhole tool, from the resonating rock at the second VPS location in the formation; and determining, using the processor and the received signals from the second VPS location, at least one parameter of the formation at the second VPS location, to thereby create an image of a virtual borehole including the first and second VPS locations.

In some embodiments, the method further includes: relocating the imaging tool to a different location within the borehole; creating additional virtual point sources (VPS's) at corresponding locations in the formation remote from the borehole; receiving corresponding signals, using the plurality of receivers of the downhole tool, from each of the additional VPS locations in the formation; and determining, using the processor and the received signals from each additional VPS location, at least one parameter of the formation at each additional VPS location, to thereby create an image of a virtual borehole including the first, second, and additional VPS locations.

Other versions can include one or more of the following embodiments:

Embodiment 1. A system for downhole operation in a well having a wellbore, a casing in the wellbore and an axis, the system comprising:
    an anchor tool configured to secure and maintain an axial position of the system in the wellbore, the anchor tool comprising dogs that are hydraulically-actuated, the dogs have an unlocked position wherein the dogs are at least substantially within the anchor tool, and a locked position wherein the dogs extend radially from the anchor tool into direct contact with the wellbore or a casing of the wellbore;
    a rotation tool coupled to the anchor tool and to an imaging tool, the rotation tool is configured to rotate the imaging tool in the wellbore to selected circumferential angles with respect to the axis; and wherein the imaging tool comprises:
    a transducer configured to interrogate a formation in which the well resides.

Embodiment 2. The system of any of these embodiments, wherein, in the locked position, the dogs centralize the anchor tool in the wellbore with respect to the axis.

Embodiment 3. The system of any of these embodiments, wherein the anchor tool is repeatably resettable between the unlocked and locked positions.

Embodiment 4. The system of any of these embodiments, wherein the anchor tool comprises a lock housing having open windows in which the dogs reside, the dogs are mounted to a piston that is axially movable within the lock housing, and the piston has diagonal surfaces relative to the axis on which the dogs move between the unlocked and locked positions.

Embodiment 5. The system of any of these embodiments, wherein a piston return spring axially moves the piston from the locked position to the unlocked position after hydraulic pressure is released.

Embodiment 6. The system of any of these embodiments, wherein the anchor tool further comprises a hydraulic reservoir, a hydraulic motor, an electric solenoid valve, a pressure compensation piston and a hydraulic manifold.

Embodiment 7. The system of any of these embodiments, wherein the rotation tool comprises a rotation motor, a transmission, a rotation mandrel coupled to a ring gear of the anchor tool to rotate the rotation tool relative to the anchor tool.

Embodiment 8. The system of any of these embodiments, wherein the rotation tool is configurable to rotate at a constant rate, a variable rate, an intermittent rate or to specific circumferential angles relative to the axis.

Embodiment 9. The system of any of these embodiments, wherein the rotation tool is configurable to incrementally rotate the imaging tool by increments as small as less than one degree relative to the axis.

Embodiment 10. The system of any of these embodiments, wherein the rotation tool is configurable to rotate the imaging tool at a rotational speed of about 0.1 degree per minute to about 5 degrees per second.

Embodiment 11. The system of any of these embodiments, wherein the rotation tool has a rotational range of about 0 degrees to about 400 degrees relative to the axis.

Embodiment 12. The system of any of these embodiments, wherein the imaging tool comprises one of an acoustic imaging system, well-logging tool, downhole seismic array, adaptive acoustic array, active array, passive array, synthetically focused array, divergent array, phased array, parametric array, ultra-sparse array or variable length array.

Embodiment 13. The system of any of these embodiments, further comprising a fiber optic multiplexer coupled to the imaging tool for communicating with a device at a surface of the well via at least one of fiber optics and a data communications line.

Embodiment 14. The system of any of these embodiments, wherein the system communicates imaging data in real-time with the device.

Embodiment 15. The system of any of these embodiments, wherein the system is configured to image from a perspective of a virtual point source (VPS) in the formation that is a distance from the well in which the system resides.

Embodiment 16. The system of any of these embodiments, wherein the distance is in a range of about 1 meter to about 300 meters.

Embodiment 17. The system of any of these embodiments, wherein the imaging tool is configured to physically vibrate the formation at the VPS.

Embodiment 18. The system of any of these embodiments, wherein the imaging tool is configured to interpret a return signal from the VPS to characterize parameters of the formation at the VPS.

Embodiment 19. The system of any of these embodiments, wherein the imaging tool is configured to provide information about the VPS including at least one of a P-wave to S-wave velocity ratio (Vp/Vs) to derive at least one of an elastic modulus of the formation, permeability or porosity of the formation.

Embodiment 20. The system of any of these embodiments, wherein the imaging tool comprises one or more transducer sections.

Embodiment 21. The system of any of these embodiments, wherein the transducer sections are adjacent to each other.

Embodiment 22. The system of any of these embodiments, wherein the transducer sections are spaced apart from each other by spacers.

Embodiment 23. The system of any of these embodiments, wherein the imaging tool comprises a housing having open windows for unobstructed access to the wellbore, and the transducers are positioned in the open windows.

Embodiment 24. The system of any of these embodiments, wherein the transducers have a retracted position wherein the transducers are at least substantially within the housing, and an extended position wherein the transducers directly physically contact the casing of the wellbore.

Embodiment 25. The system of any of these embodiments, wherein at least some of the transducers are hydraulically-actuated between retracted and extended positions.

Embodiment 26. The system of any of these embodiments, wherein the imaging tool comprises transmitters for transmitting signals and receivers for receiving signals.

Embodiment 27. The system of any of these embodiments, wherein the transmitted signals comprise a frequency of about 50 Hz to about 25 kHz.

Embodiment 28. The system of any of these embodiments, wherein the transmitters and receivers are interleaved in an alternating pattern.

Embodiment 29. The system of any of these embodiments, wherein the transmitters and receivers are uniformly patterned in a symmetrical configuration or a random configuration.

Embodiment 30. The system of any of these embodiments, wherein the transmitters and receivers have a retracted position wherein they are substantially radially retracted within the tool relative to the axis, and an extended position wherein they extend radially outward from the tool relative to the axis and are configured to directly physically contact the wellbore or a casing of the wellbore.

Embodiment 31. The system of any of these embodiments, wherein the transmitters and receivers are not encased with the tool such that they are unobstructed and exposed to an environment of the well.

Embodiment 32. The system of any of these embodiments, wherein:
the transmitters are identical to each other, and the receivers are not identical to each other and comprise at least one hydrophone or geophone; or
the transmitters are not identical to each other, and the receivers are identical to each other.

Embodiment 33. The system of any of these embodiments, wherein the transmitters simultaneously emit signals as the receivers receive signals.

Embodiment 34. The system of any of these embodiments, wherein the transmitters are hydraulically actuated, and the receivers are spring-actuated.

Embodiment 35. The system of any of these embodiments, wherein the transmitters comprise a transmitter hydraulic system that is separate from a hydraulic system for the anchor tool.

Embodiment 36. The system of any of these embodiments, wherein the transmitters and anchor tool are on a same hydraulic system.

Embodiment 37. The system of any of these embodiments, wherein a hydraulic force for the transmitters is in a range of about 0 psi to about 3000 psi, and a spring force for the receivers is in a range of about 1 lbf to about 20 lbf.

Embodiment 38. The system of any of these embodiments, further comprising a power management module to manage and distribute power and signals to the transmitters.

Embodiment 39. The system of any of these embodiments, wherein the transmitters and receivers comprise piezostrictive or magnetostrictive materials.

Embodiment 40. The system of any of these embodiments, wherein the transmitters comprise at least one of Fe, Tb, Py, Ga and Dy.

Embodiment 41. The system of any of these embodiments, wherein the imaging tool comprises a module controller board having ad hoc waveforms or pre-set waveforms for transmitters of the imaging tool.

Embodiment 42. The system of any of these embodiments, wherein the imaging tool provides three-dimensional images of the formation to a device at a surface of the well in real-time.

Embodiment 43. The system of any of these embodiments, further comprising a cable head connector configured to connect to at least one of a wireline, tubing or drill pipe such that the system is configured to be thereby lowered into and retrieved from the wellbore.

Embodiment 44. The system of any of these embodiments, further comprising a positioning system to provide an azimuth orientation, north-finding solution for the imaging tool, and the positioning system comprises at least one of an accelerometer, gyroscope, magnetometer or dip meter.

Embodiment 45. The system of any of these embodiments, further comprising a power supply comprising a voltage source of about 300 V to about 600V, and variable current output.

Embodiment 46. The system of any of these embodiments, further comprising a tool controller for controlling the anchor tool, rotation tool and imaging tool.

Embodiment 47. The system of any of these embodiments, further comprising a computer at a surface of the well for communicating with the imaging tool and data acquisition.

Embodiment 48. The system of any of these embodiments, wherein the system is configured to provide near-field imaging adjacent the well, and far-field imaging more than about 200 meters from the well.

Embodiment 49. The system of any of these embodiments, wherein the rotation tool can rotate the imaging tool as the system is moving axially within the well when the anchor tool is in the unlocked position.

Embodiment 50. The system of any of these embodiments, wherein the system can be operated remotely by an operator, or the system can operate autonomously.

Embodiment 51. A method of operating a downhole tool in a wellbore having an axis, the method comprising:
 (a) signaling a hydraulic motor to energize a hydraulic pump and extend dogs into contact with a casing of the wellbore;
 (b) engaging a solenoid to hold hydraulic pressure;
 (c) powering a rotation motor to begin a sequence of rotation and operate a transmission to rotate an acoustic array;
 (d) stopping rotation of the rotation motor when the acoustic array is at a desired position;
 (e) powering and signaling the acoustic array to operate transducers and receiving data from a surrounding formation of the wellbore;
 (f) disengaging the solenoid to release hydraulic pressure such that the dogs retract;
 (g) changing an axial position of the downhole tool in the wellbore to a new position; and then
 (h) repeating steps (a) through (f) at the new position.

Embodiment 52. The method of any of these embodiments, further comprising:
 determining an azimuth orientation, north-finding solution to define a stop position for the acoustic array and positioning the acoustic array at the stop position;
 rotating the acoustic array through 360 degrees to image the surrounding formation; and then
 returning the acoustic array to the stop position.

Embodiment 53. The method of any of these embodiments, wherein step (e) comprises hydraulically loading the transducers to couple to the casing of the wellbore.

Embodiment 54. An imaging system for imaging a formation in a wellbore, the imaging system being configured to be coupled to a downhole tool in the wellbore, the imaging system comprising:
 a housing having an open window for unobstructed access to the wellbore; and
 a transducer mounted in the housing, the transducer having a retracted position wherein the transducer is at least substantially within the housing, and an extended position wherein the transducer directly physically contacts the wellbore or a casing of the wellbore, and wherein the transducer is hydraulically-actuated between the retracted and extended positions.

Embodiment 55. A hybrid system, comprising:
 a system in a borehole of a well in a formation;
 a fiber optic array extending a length of the well, the fiber optic array having a fiber optic line comprising a distributed acoustic sensing system; and wherein
 the hybrid system can transmit two waveforms having frequencies of about 5 kHz and about 5.1 kHz that, when combined as in parametric imaging methods, comprise a frequency of about 100 Hz.

Embodiment 56. The hybrid system of any of these embodiments, wherein the hybrid system is configured to image from a perspective of a virtual point source (VPS) in the formation that is a distance from the well in which the hybrid system resides.

Other embodiments are contemplated, and can include combinations thereof. In one embodiment for a method using a downhole tool within a single borehole for imaging a geologic formation in a region remote from the single borehole, the method includes: focusing acoustic energy to create a virtual point source (VPS) at a first location in the formation remote from the borehole, using a plurality of phase controlled transducers of the downhole tool, to resonate the rock formation at the first VPS location; receiving signals, using a plurality of receivers of the downhole tool, from the resonating rock at the first VPS location in the formation; communicating the received signals to a processor; and determining, using the processor and the received signals, at least one parameter of the formation at the first VPS location.

In some embodiments, the method further includes varying the phase control of the plurality of transducers to cause the VPS to be supersonically repeatedly moved between the first location and a second location that is an offset distance from the first location, to create a shear wave in the formation at the first VPS location.

In some embodiments, the at least one parameter includes an elastic modulus of the formation.

In some embodiments, the offset distance is determined based upon at least one of the density of the rock, the speed of sound in the rock, the frequency of the transmitted acoustic wave, the amplitude of the transmitted acoustic wave, or the number of pulses of the transmitted acoustic wave.

In some embodiments, the method further includes: focusing acoustic energy to create a second VPS at a corresponding second location in the formation remote from the borehole, using the plurality of phase controlled transducers of the downhole tool, to resonate the rock formation at the second VPS location; receiving signals, using the plurality of receivers of the downhole tool, from the resonating rock at the second VPS location in the formation; and determining, using the processor and the received signals from the second VPS location, at least one parameter of the formation at the second VPS location, to thereby create an image of a virtual borehole including the first and second VPS locations.

In some embodiments, the method further includes: relocating the imaging tool to a different location within the borehole; creating additional virtual point sources (VPS's) at corresponding locations in the formation remote from the borehole; receiving corresponding signals, using the plurality of receivers of the downhole tool, from each of the additional VPS locations in the formation; and determining, using the processor and the received signals from each additional VPS location, at least one parameter of the formation at each additional VPS location, to thereby create an image of a virtual borehole including the first, second, and additional VPS locations.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

Note that not all of the activities described above in the general description or the examples are required, that a portion of a specific activity may not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges can include each and every value within that range. References to numerical values, whether stated in a range or standing alone, are intended to represent approximate values unless the context clearly requires otherwise.

What is claimed is:

1. A method of imaging a formation around a first borehole, the method comprising:
   focusing first outbound acoustic energy, launched from a plurality of acoustic sources spaced along a tool disposed within the first borehole, on a first volume within the formation spaced away from the first borehole, the focusing creating a first virtual point source (VPS) from which a first return acoustic energy propagates, wherein the first volume of the first VPS experiences a pressure change due to constructive wave interference of acoustic waves at the first volume;
   receiving the first return acoustic energy from the first VPS at a plurality of seismic sensors; and
   determining a parameter of the formation between the first VPS and a location of the seismic sensors using the first return acoustic energy;
   wherein the focusing of the first outbound acoustic energy creates the first VPS using beamforming that emits the first outbound acoustic energy from the plurality of acoustic sources with controlled delays, wherein the controlled delays are based on distances between location of the first VPS and the plurality of acoustic sources as well as formation sonic velocity.

2. The method of claim 1, wherein the plurality of acoustic sources comprises an array of acoustic sources activated as a phased array to focus the first outbound acoustic energy and create the first VPS.

3. The method of claim 2, wherein focusing the first outbound acoustic energy comprises sending, from each acoustic source in the array of acoustic sources, a signal having two distinct frequencies, and wherein a beat frequency as between the two distinct frequencies is less than 1000 Hertz.

4. The method of claim 2, wherein focusing the first outbound acoustic energy comprises:
   sending, from a first plurality of sources of the array of acoustic sources, signals having a first frequency; and
   simultaneously sending, from a second plurality of sources of the array of acoustic sources, signals having a second frequency different than the first frequency;
   wherein a beat frequency as between the first and second frequencies is less than 1000 Hertz.

5. The method of claim 1, wherein receiving the first return acoustic energy comprises receiving by the plurality of seismic sensors disposed on the tool within the first borehole.

6. The method of claim 1, further comprising:
   focusing second outbound acoustic energy, launched from the plurality of acoustic sources spaced along the tool disposed within the first borehole, on a second volume within the formation spaced away from the first borehole, the focusing creating a second VPS from which a second return acoustic energy propagates, wherein the second volume of the second VPS experiences a pressure change due to constructive wave interference of acoustic waves at the second volume, wherein the second VPS is different than the first VPS;
   receiving the second return acoustic energy from the second VPS at a plurality of seismic sensors; and
   determining a parameter of the formation between the second VPS and the first borehole;
   wherein the focusing of the second outbound acoustic energy creates the second VPS using beamforming that emits the second outbound acoustic energy from the plurality of acoustic sources with additional controlled delays, wherein the additional controlled delays are based on distances between location of the second VPS and the plurality of acoustic sources as well as formation sonic velocity.

7. The method of claim 6, further comprising holding the tool at an azimuthal direction that is constant for both the focusing of the first and second outbound acoustic energies, and holding the tool at a depth that is constant within the first borehole for the focusing of both the first and second outbound acoustic energies.

8. The method of claim 6, further comprising changing depth of the tool within the first borehole between focusing the first outbound acoustic energy and focusing the second outbound acoustic energy.

9. The method of claim 5, further comprising
   rotating the tool about a tool central axis from a first azimuthal direction to a second azimuthal direction; and then
   focusing second outbound acoustic energy, launched from the plurality of acoustic sources spaced along the tool disposed within the first borehole, on a second volume within the formation spaced away from the first borehole, the focusing creating a second VPS from which a second return acoustic energy propagates, wherein the second volume of the second VPS experiences a pressure change due to constructive wave interference of acoustic waves at the second volume, wherein the second VPS is different than the first VPS;

receiving the second return acoustic energy from the second VPS at the plurality of seismic sensors disposed on the tool within the first borehole; and determining a parameter of the formation between the second VPS and the first borehole;

wherein the focusing of the second outbound acoustic energy creates the second VPS using beamforming that emits the second outbound acoustic energy from the plurality of acoustic sources with additional controlled delays, wherein the additional controlled delays are based on distances between location of the second VPS and the plurality of acoustic sources as well as formation sonic velocity.

10. The method of claim 1, wherein the focusing comprises:

focusing a first portion of the first outbound acoustic energy at a first location within the first volume; and then focusing a second portion of the first outbound acoustic energy at a second location within the first volume, thereby creation a pressure wave within the first volume.

11. The method of claim 1, wherein the focusing comprises:

focusing a first portion of the first outbound acoustic energy at a first frequency; and then focusing a second portion of the first outbound acoustic energy at a second frequency;

wherein determining the parameter further comprises determining a resonant frequency of the first volume of the first VPS.

12. The method of claim 11, wherein focusing the first portion and focusing the second portion further comprising sending a continuous tone that sweeps in frequency between the first frequency and the second frequency.

13. The method of claim 1, wherein the focusing comprises:

focusing the first outbound acoustic energy as a first chirp;

wherein determining the parameter further comprises determining a resonant frequency of the first volume of the first VPS.

14. The method of claim 1, wherein receiving the first return acoustic energy comprises receiving by the plurality of seismic sensors disposed in a second borehole spaced apart from the first borehole.

15. The method of claim 1, wherein receiving the first return acoustic energy comprises receiving by the plurality of seismic sensors disposed at the surface of the Earth.

16. The method of claim 1, wherein the focusing comprises:

shifting focal point of the first outbound acoustic energy supersonically in order to induce a shear wave in rock.

17. The method of claim 16, wherein the shear wave is sufficient to vibrate rock particles.

18. The method of claim 16, wherein the shear wave is sufficient to open or close a fracture.

19. The method of claim 1, wherein the first VPS excludes interfaces of rock formations having different densities and from which acoustic energy reflects.

20. The method of claim 6, wherein the second VPS excludes interfaces of rock formations having different densities and from which acoustic energy reflects.

21. The method of claim 9, wherein the second VPS excludes interfaces of rock formations having different densities and from which acoustic energy reflects.

* * * * *